(12) United States Patent
Lim et al.

(10) Patent No.: US 12,063,901 B2
(45) Date of Patent: Aug. 20, 2024

(54) PLANT CULTIVATION APPARATUS

(71) Applicant: LG ELECTRONICS INC., Seoul (KR)

(72) Inventors: Ki Young Lim, Seoul (KR); Tae Yang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 17/771,435

(22) PCT Filed: Aug. 19, 2020

(86) PCT No.: PCT/KR2020/011007
§ 371 (c)(1),
(2) Date: Apr. 22, 2022

(87) PCT Pub. No.: WO2021/080144
PCT Pub. Date: Apr. 29, 2021

(65) Prior Publication Data
US 2022/0361420 A1    Nov. 17, 2022

(30) Foreign Application Priority Data
Oct. 22, 2019   (KR) .................. 10-2019-0131609

(51) Int. Cl.
*A01G 9/24*           (2006.01)

(52) U.S. Cl.
CPC .............. *A01G 9/247* (2013.01); *A01G 9/249* (2019.05)

(58) Field of Classification Search
CPC ................................ A01G 9/247; A01G 9/249
See application file for complete search history.

(56) References Cited

U.S. PATENT DOCUMENTS

| | | | | |
|---|---|---|---|---|
| 10,499,574 | B2 * | 12/2019 | Lu | G08B 21/18 |
| 10,709,076 | B2 * | 7/2020 | Pham | A01G 9/0297 |
| 10,806,100 | B1 * | 10/2020 | Trtilek | A01G 9/246 |
| 11,382,289 | B2 * | 7/2022 | Joseph | A01G 31/04 |
| 2016/0113221 | A1 | 4/2016 | Wu et al. | |

(Continued)

FOREIGN PATENT DOCUMENTS

| | | | | |
|---|---|---|---|---|
| CN | 103416292 | | 7/2015 | |
| CN | 106489707 A | * | 3/2017 | A01G 31/06 |
| CN | 207022807 | | 2/2018 | |

(Continued)

OTHER PUBLICATIONS

Extended European Search Report dated Oct. 19, 2023 issued in Application No. 20878261.5.

(Continued)

*Primary Examiner* — Ebony E Evans
(74) *Attorney, Agent, or Firm* — KED & ASSOCIATES, LLP

(57) ABSTRACT

A plant cultivation apparatus of the present disclosure is proposed. In the plant cultivation apparatus, a portion where a bed cover is seated is maintained in a state of being positioned in a cultivation room together with the bed cover. In addition, the present disclosure proposes that other portions excluding the portion where the bed cover is seated are configured to be ejected from the cultivation room as needed. Therefore, the bed is washed without separation of the pod.

17 Claims, 21 Drawing Sheets

(56) References Cited

U.S. PATENT DOCUMENTS

| | | | |
|---|---|---|---|
| 2017/0099791 A1* | 4/2017 | Joseph | A01G 31/06 |
| 2019/0261589 A1* | 8/2019 | Pham | A01G 9/027 |

FOREIGN PATENT DOCUMENTS

| | | | | |
|---|---|---|---|---|
| CN | 207022807 U | * | 2/2018 | |
| CN | 107950253 A | * | 4/2018 | |
| CN | 207531574 | | 6/2018 | |
| CN | 207531574 U | * | 6/2018 | |
| CN | 109362558 A | * | 2/2019 | A01G 31/06 |
| DE | 102018101698 B3 | * | 4/2019 | A01G 25/16 |
| JP | 2014-079174 | | 5/2014 | |
| KR | 20090038555 | | 4/2009 | |
| KR | 10-2012-0007420 | | 1/2012 | |
| KR | 10-2012-0028040 | | 3/2012 | |
| KR | 20-0465385 | | 2/2013 | |
| KR | 10-1240375 | | 3/2013 | |
| KR | 20-0467246 | | 6/2013 | |
| KR | 10-1400375 | | 6/2014 | |
| KR | 10-1422636 | | 7/2014 | |
| KR | 20150082967 | | 7/2015 | |
| KR | 10-1818644 | | 1/2018 | |
| KR | 10-2019-0081515 | | 7/2019 | |
| KR | 10-2013939 | | 8/2019 | |
| KR | 10-2021578 | | 9/2019 | |
| WO | WO-2018224291 A1 | * | 12/2018 | |
| WO | WO 2019117837 | | 6/2019 | |

OTHER PUBLICATIONS

European Office Action dated Oct. 20, 2023 issued in Application No. 20 203 247.0.

International Search Report and Written Opinion dated Dec. 2, 2020 issued in PCT Application No. PCT/KR2020/011007.

* cited by examiner

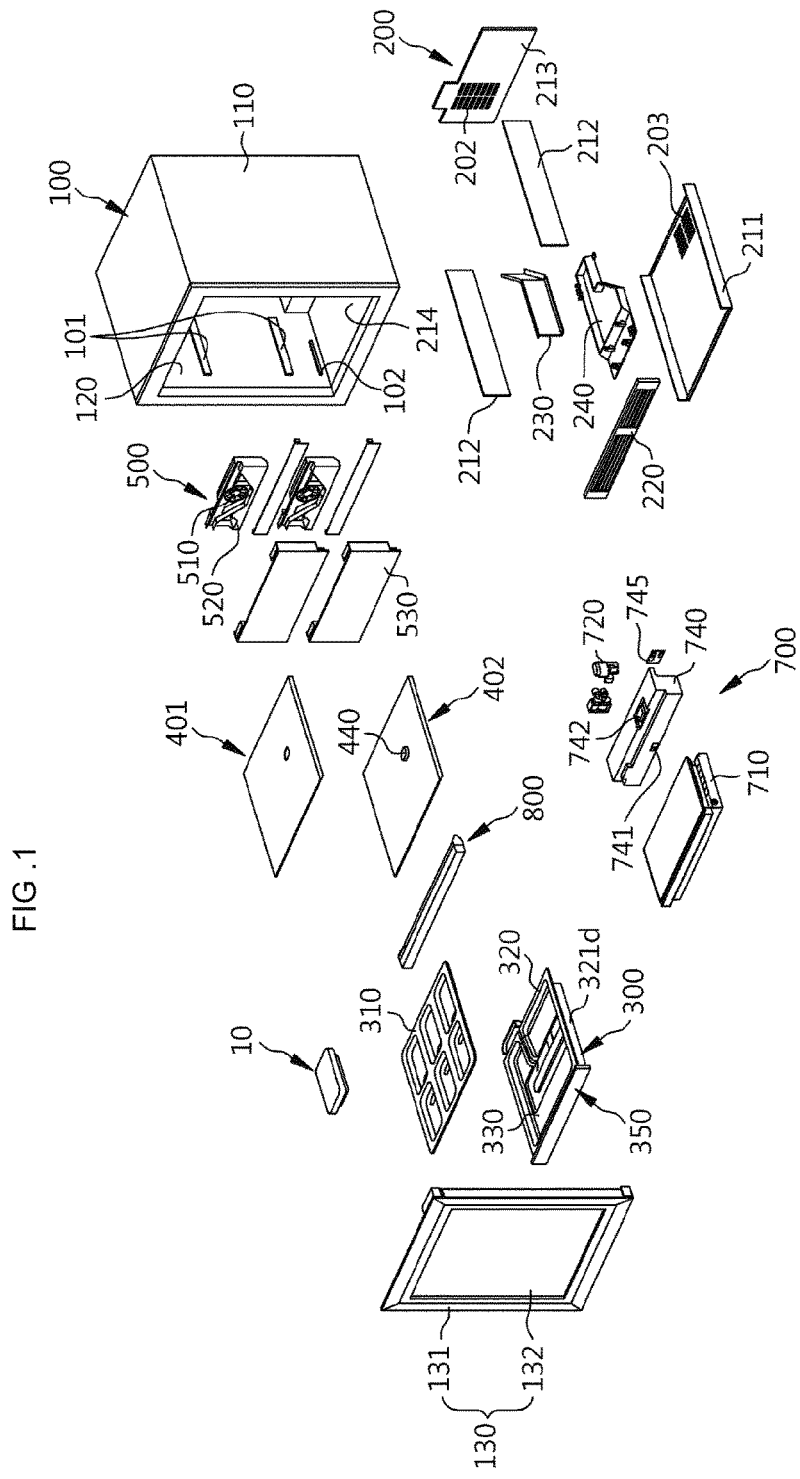

[Fig. 2]
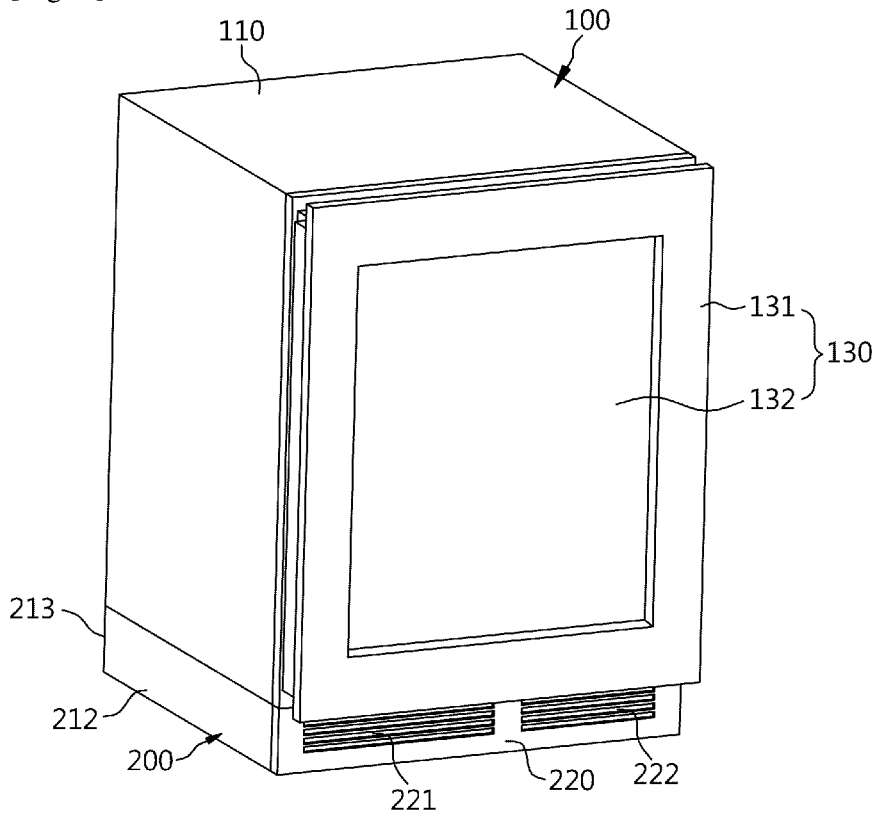
[Fig. 3]
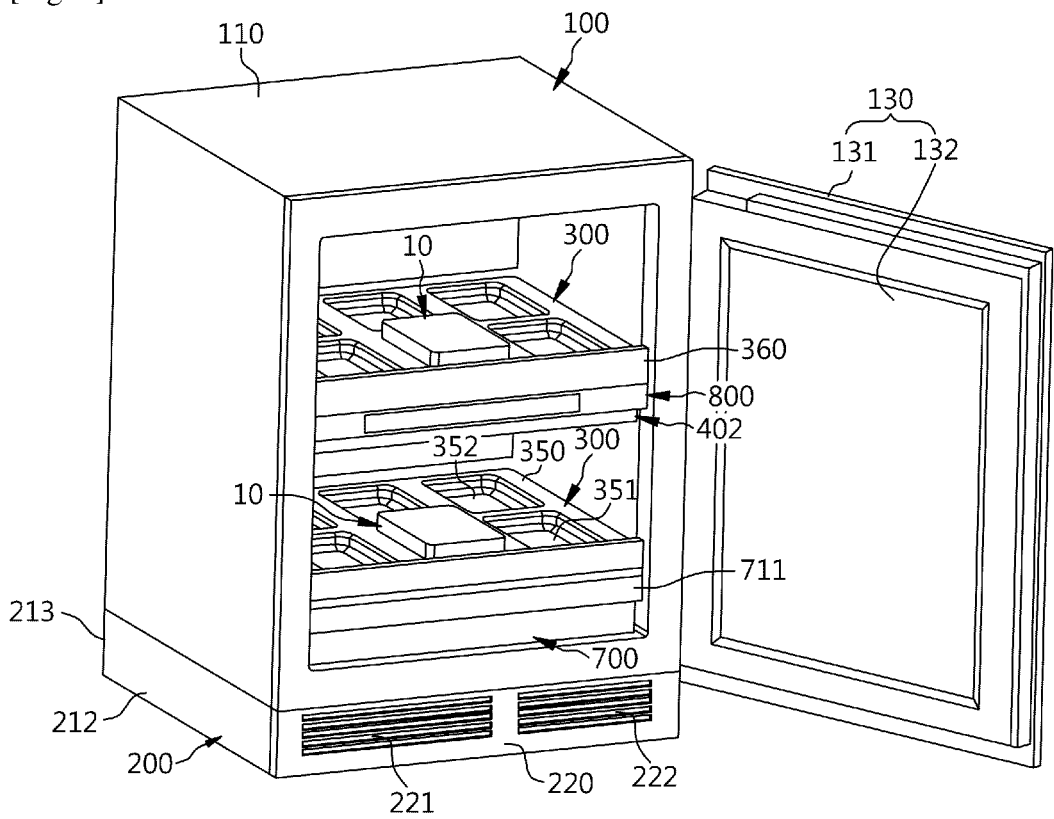

[Fig. 4]
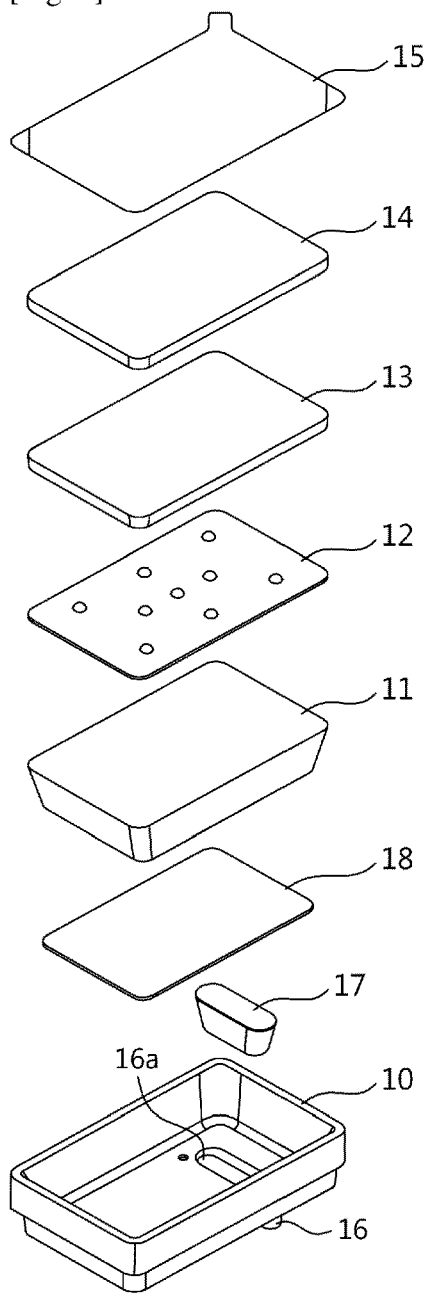
[Fig. 5]
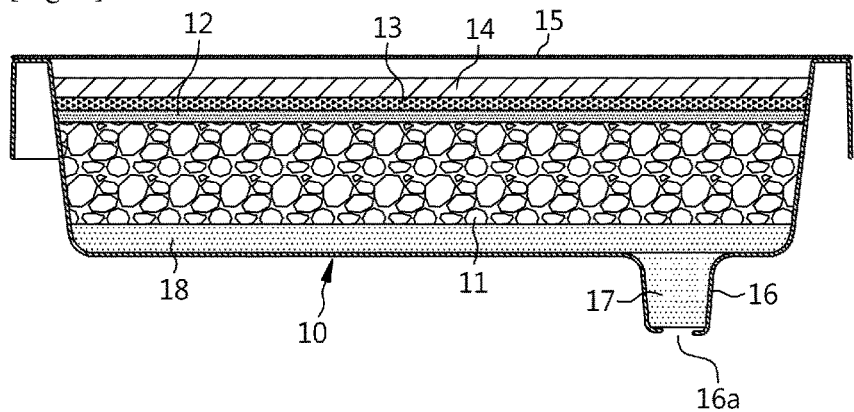

[Fig. 6]
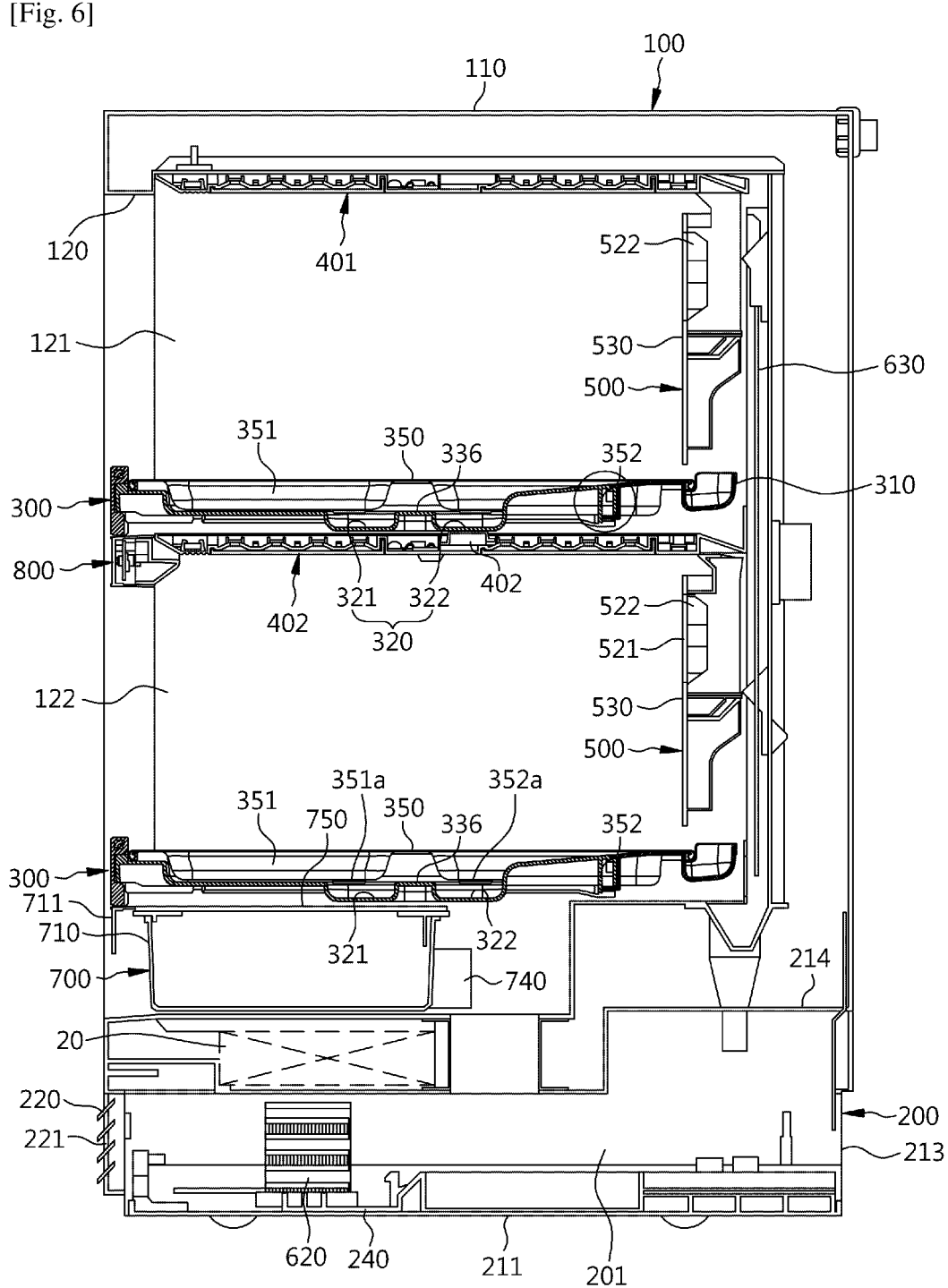

[Fig. 7]
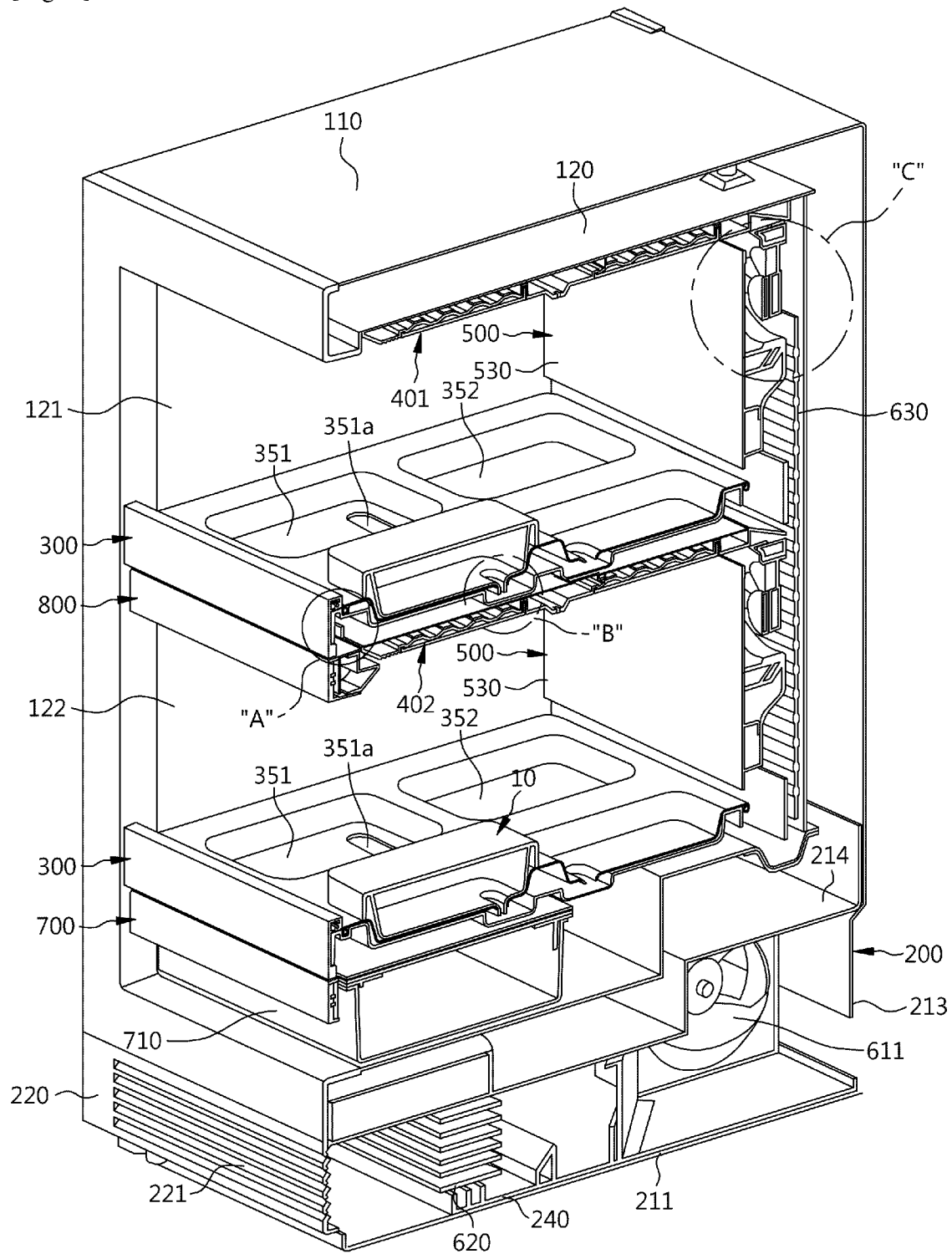

[Fig. 8]
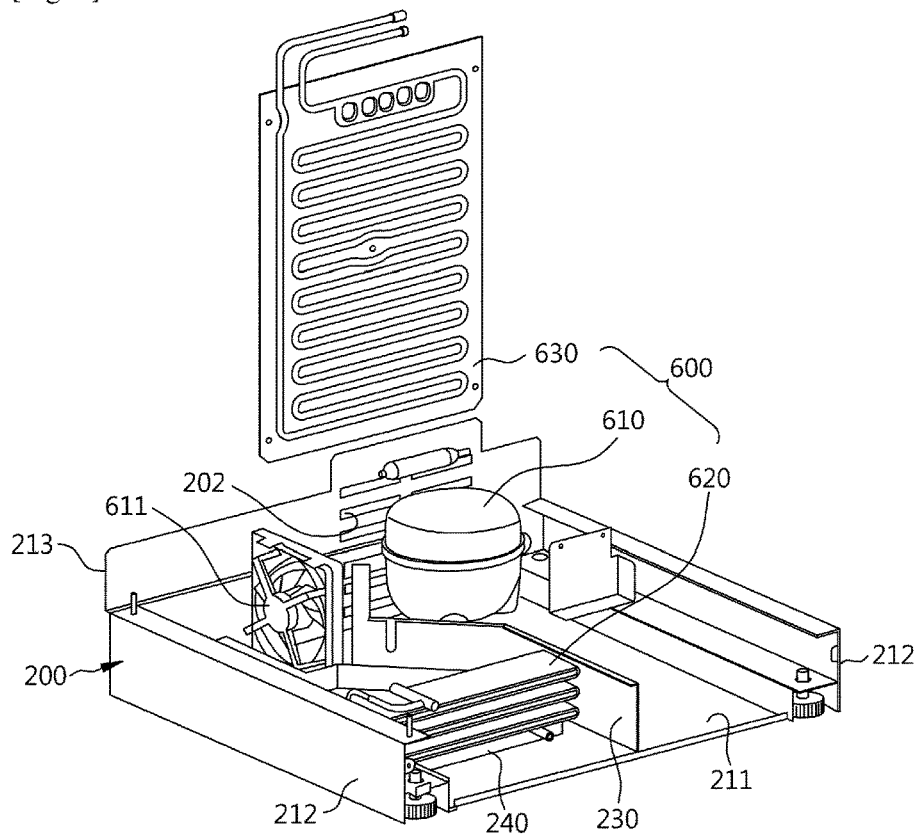
[Fig. 9]
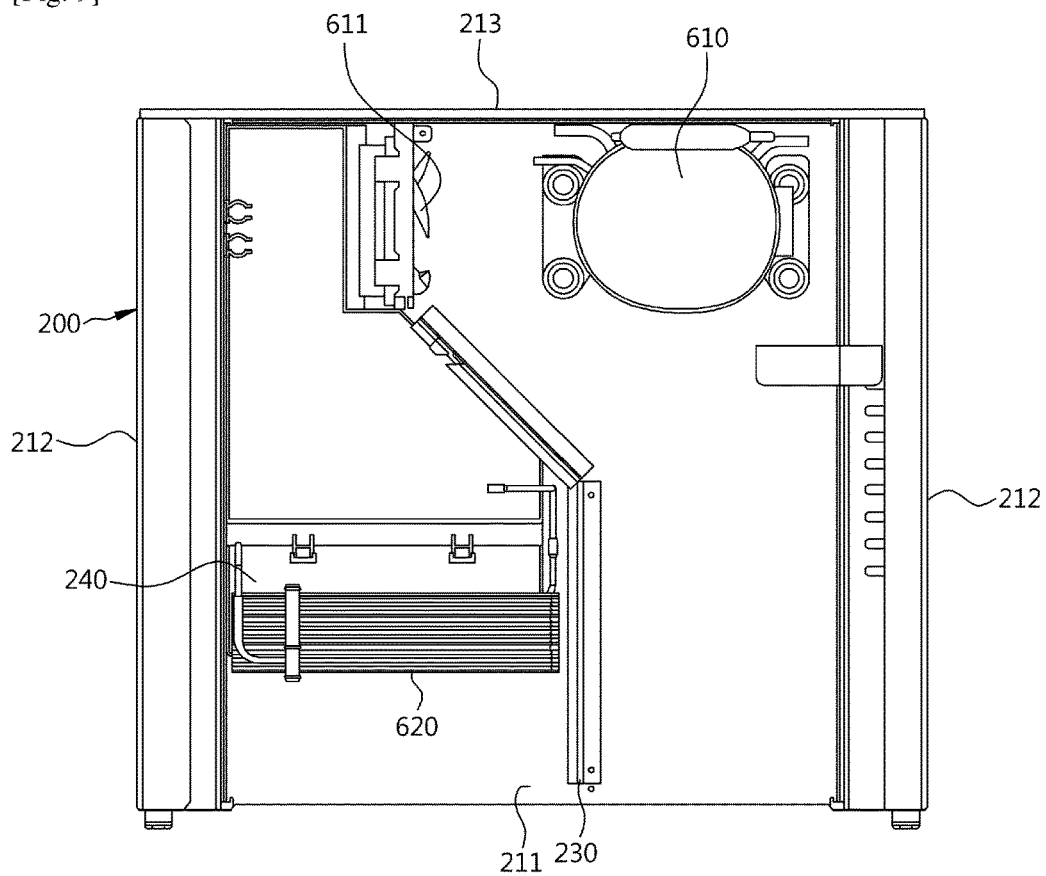

[Fig. 10]
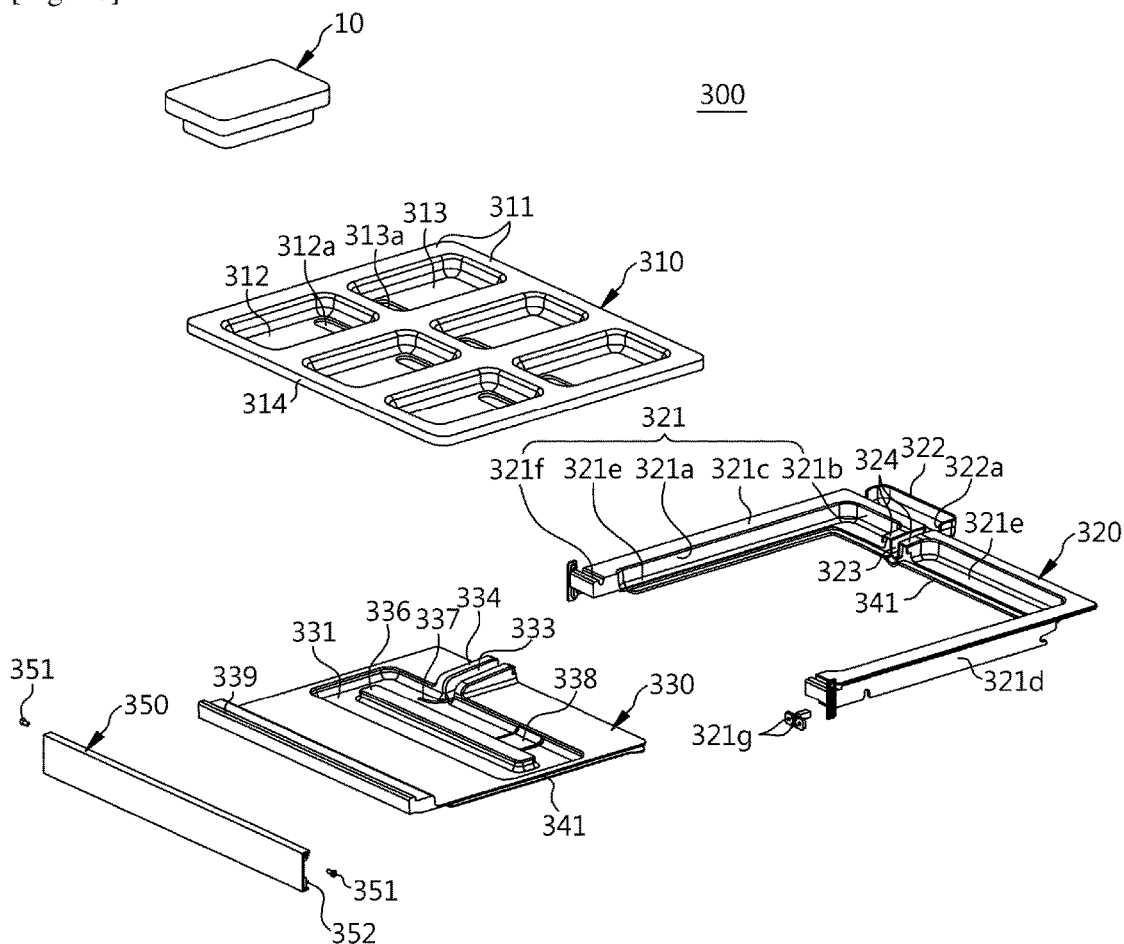
[Fig. 11]
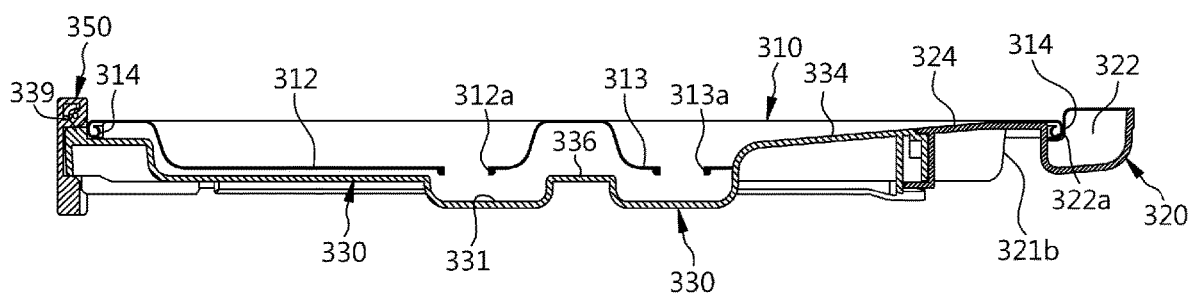

[Fig. 12]
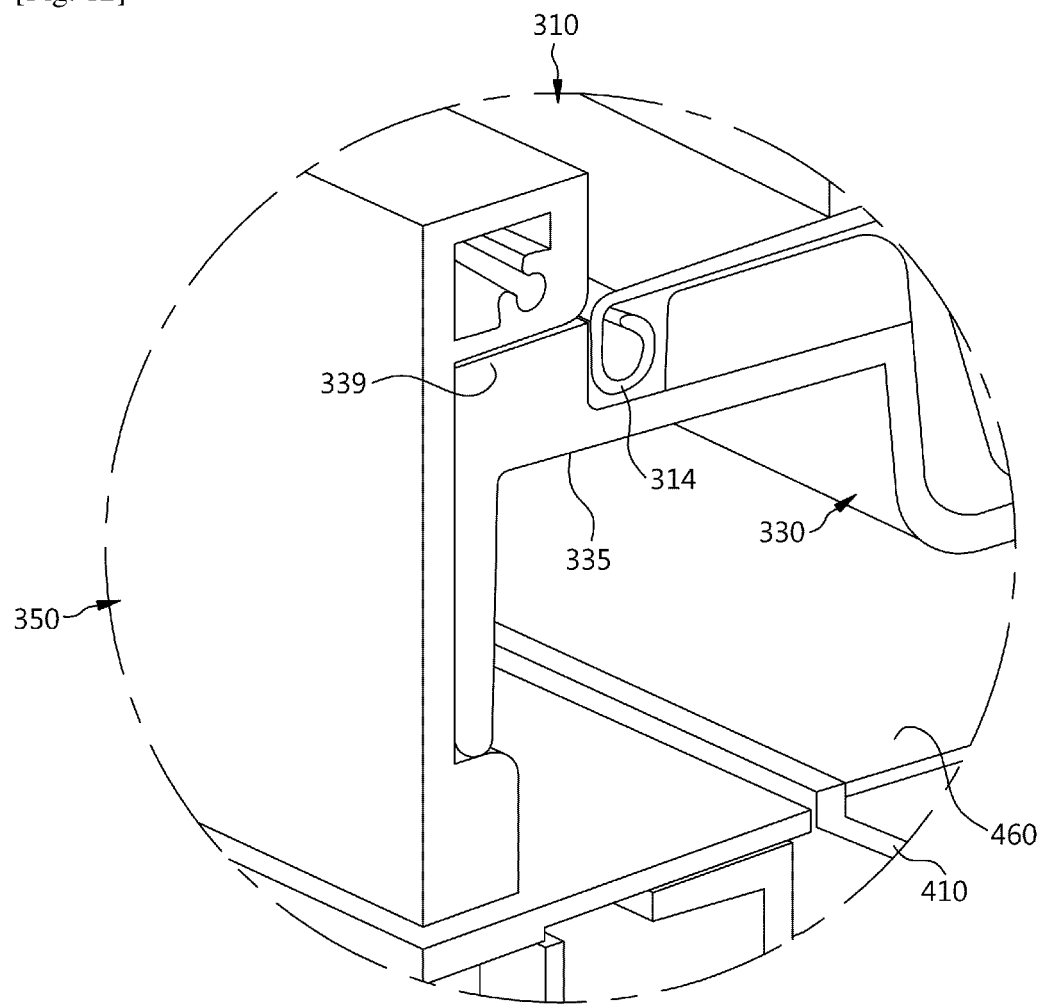

[Fig. 13]
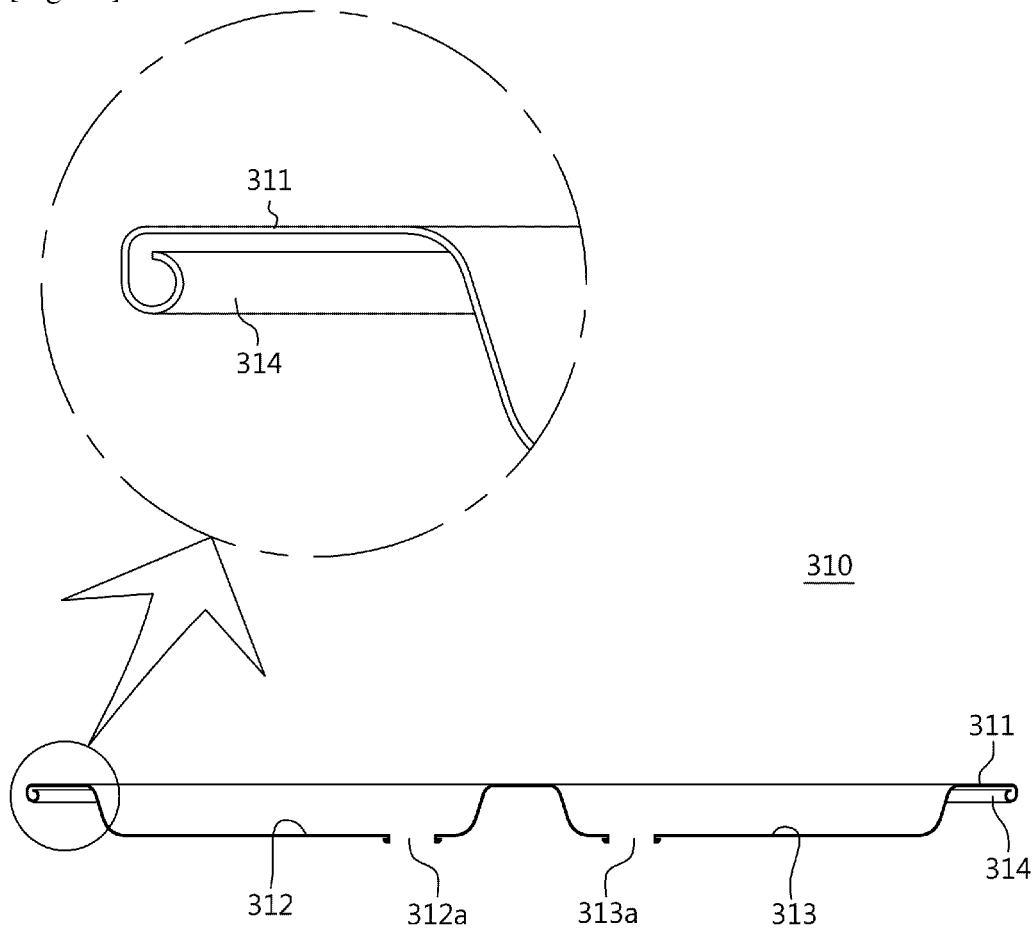
[Fig. 14]
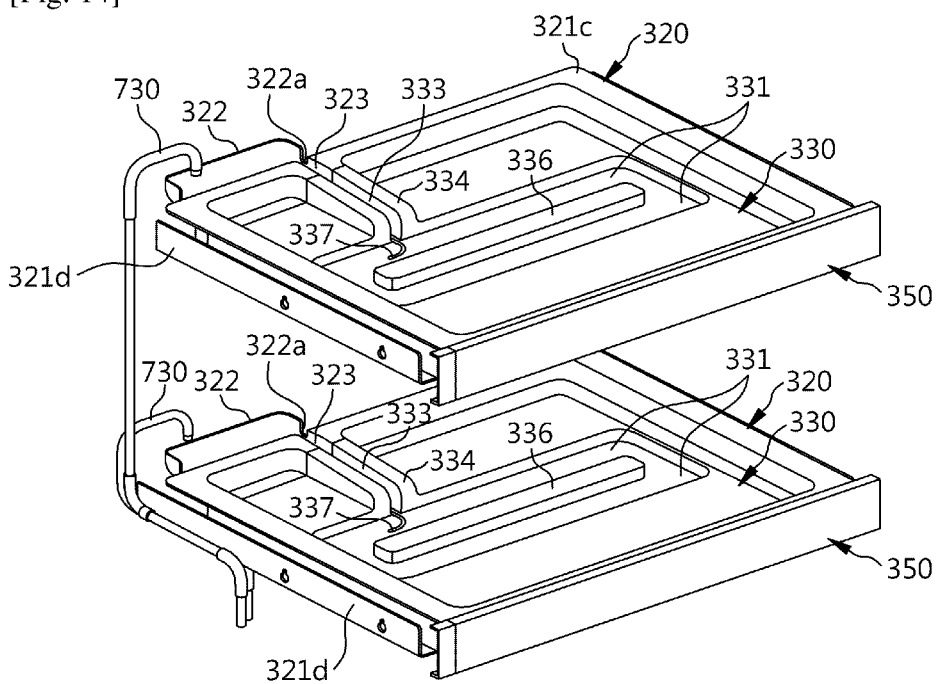

[Fig. 15]
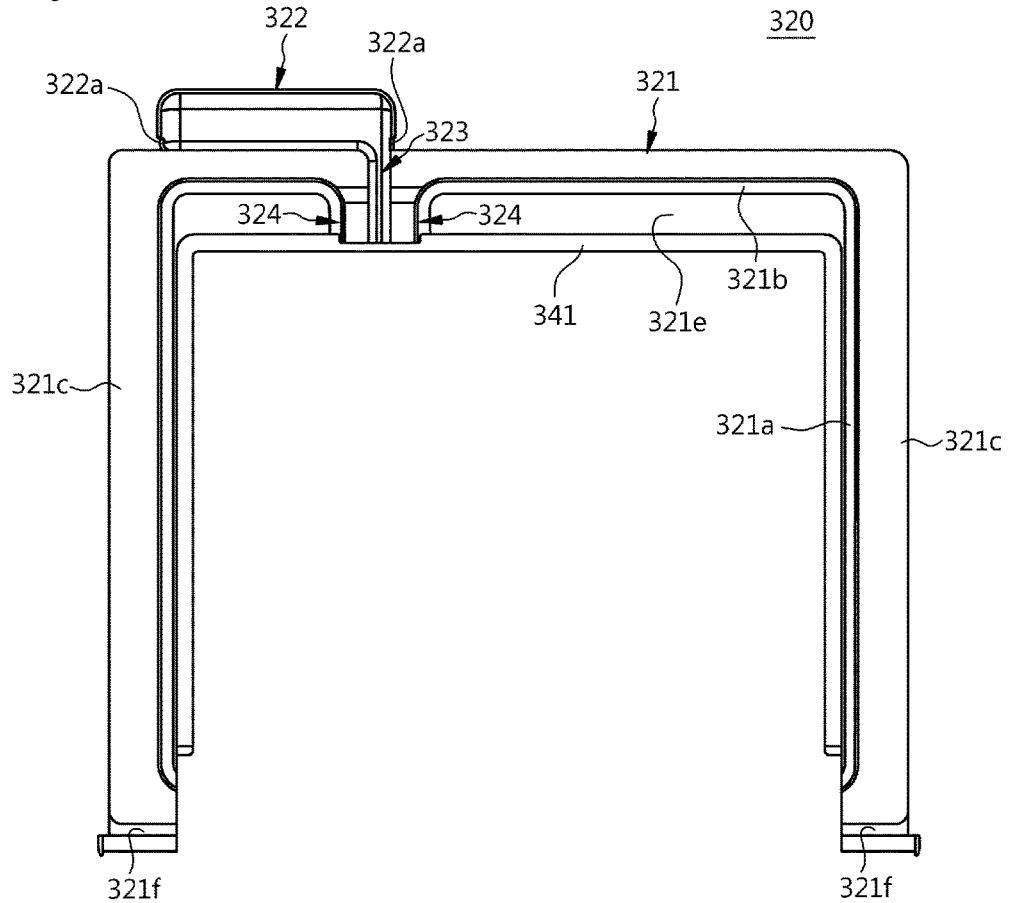
[Fig. 16]
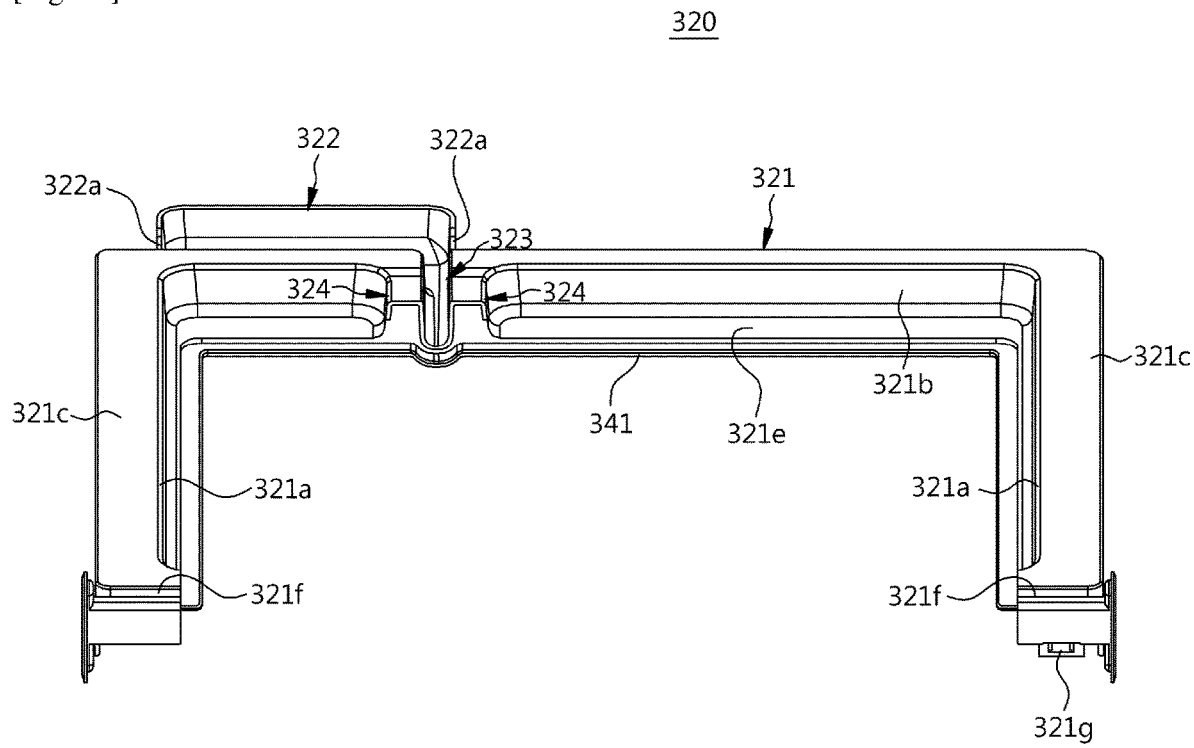

[Fig. 17]
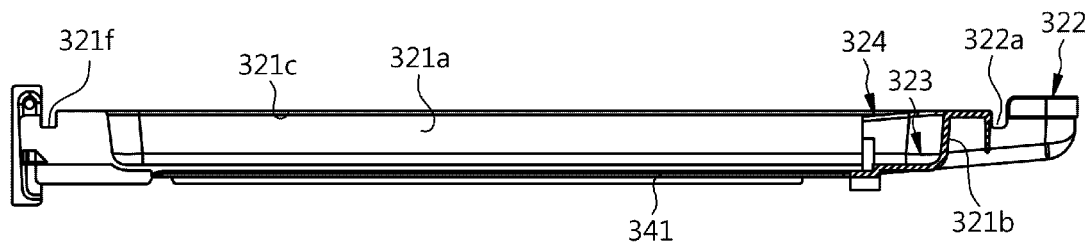
[Fig. 18]
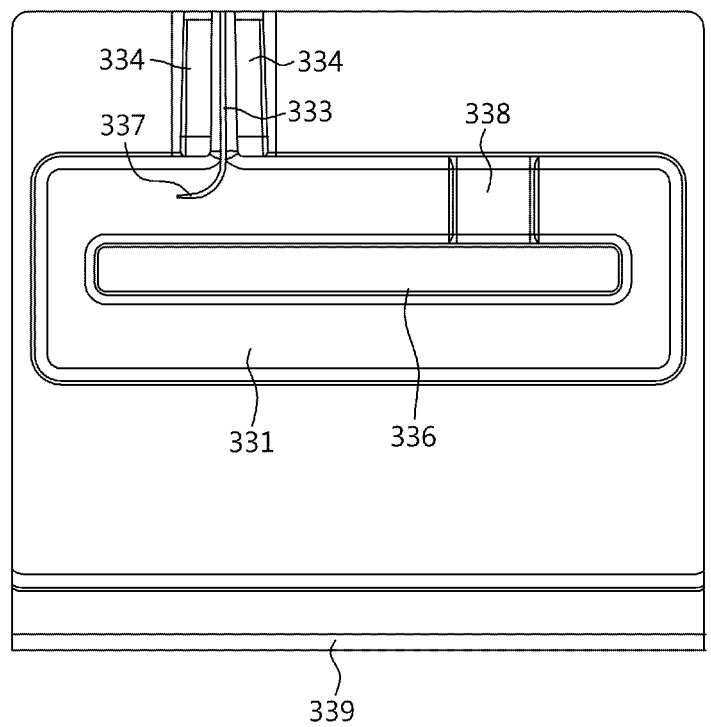
[Fig. 19]
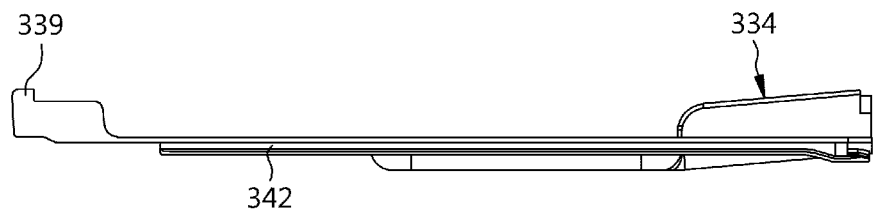

[Fig. 20]
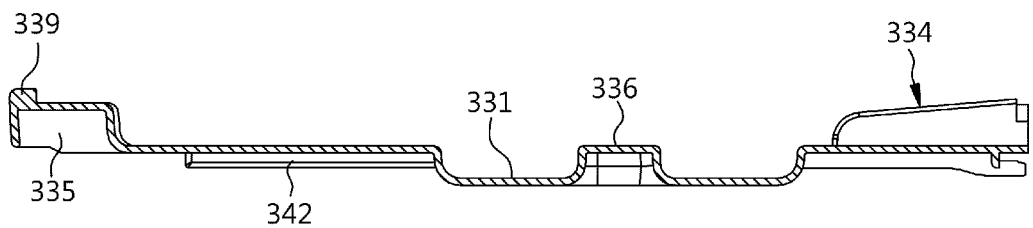
[Fig. 21]
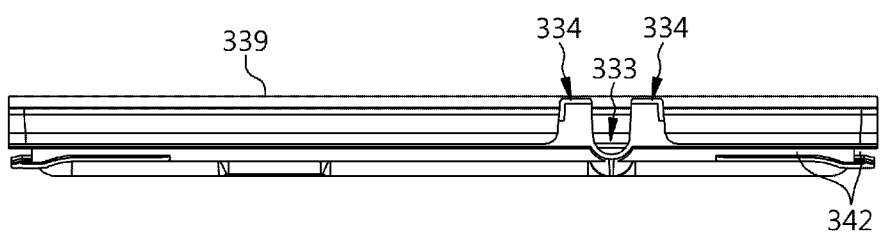
[Fig. 22]
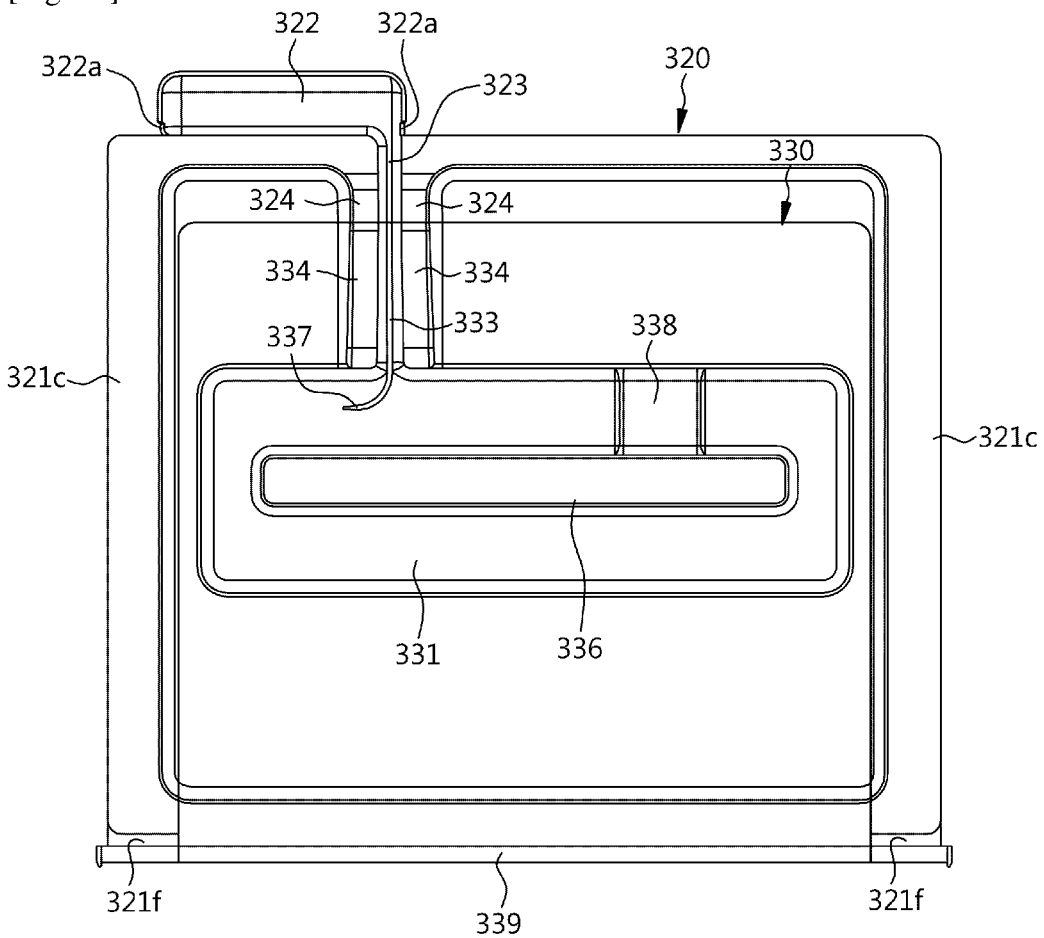

[Fig. 23]
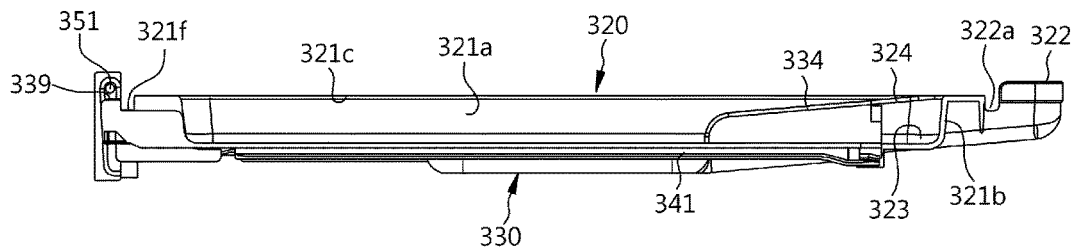
[Fig. 24]
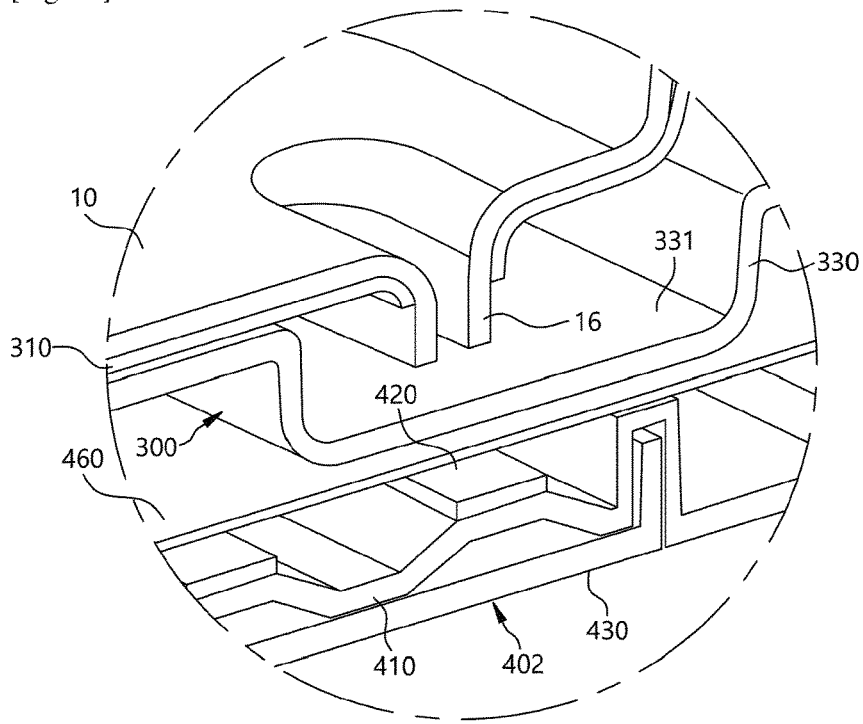
[Fig. 25]
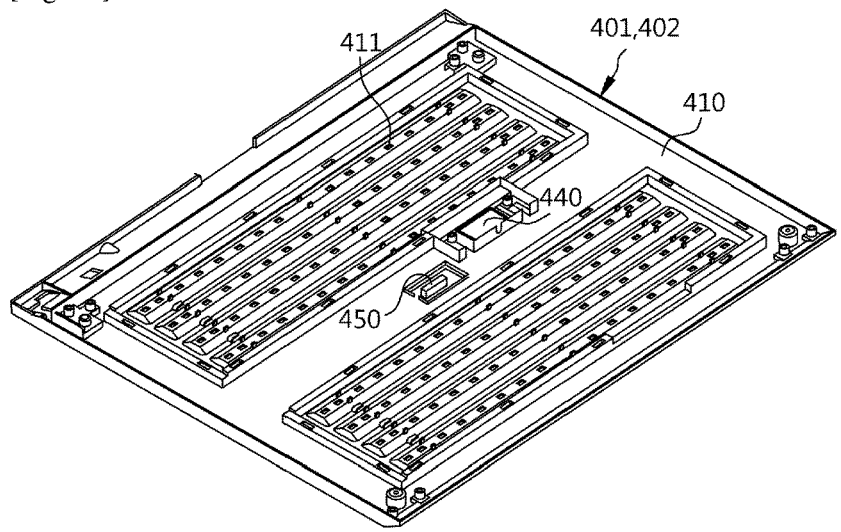

[Fig. 26]
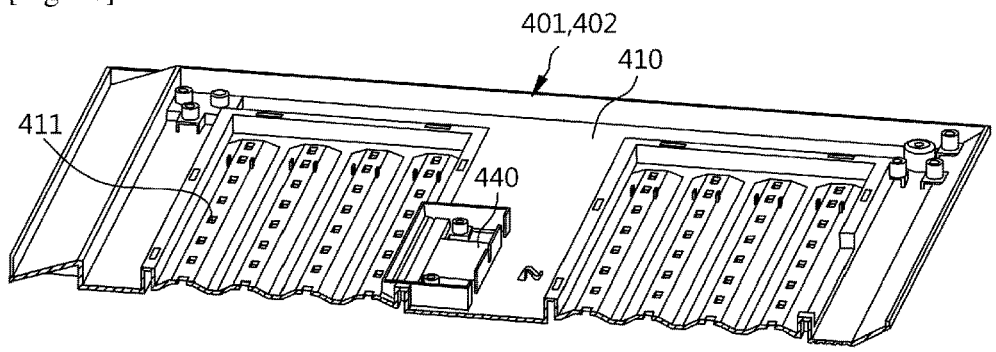
[Fig. 27]
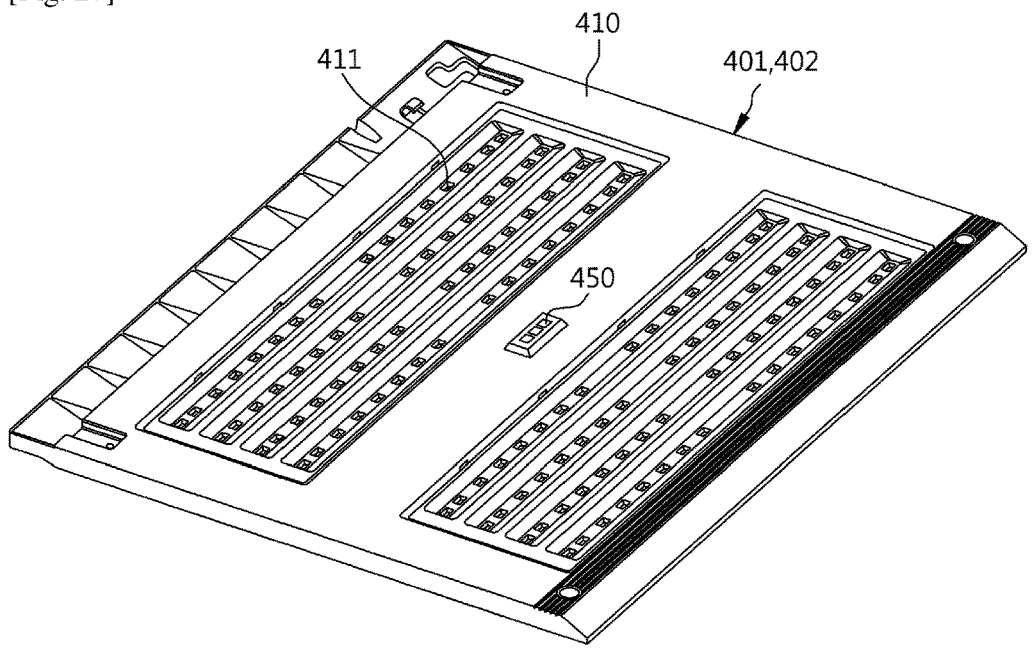
[Fig. 28]
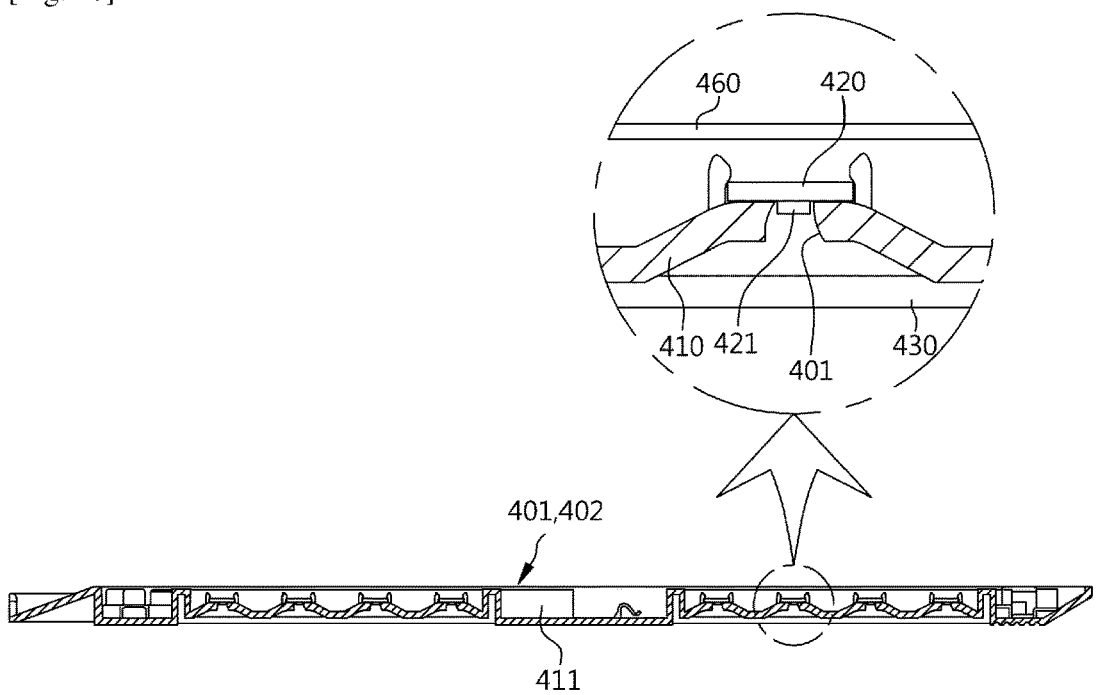

[Fig. 29]
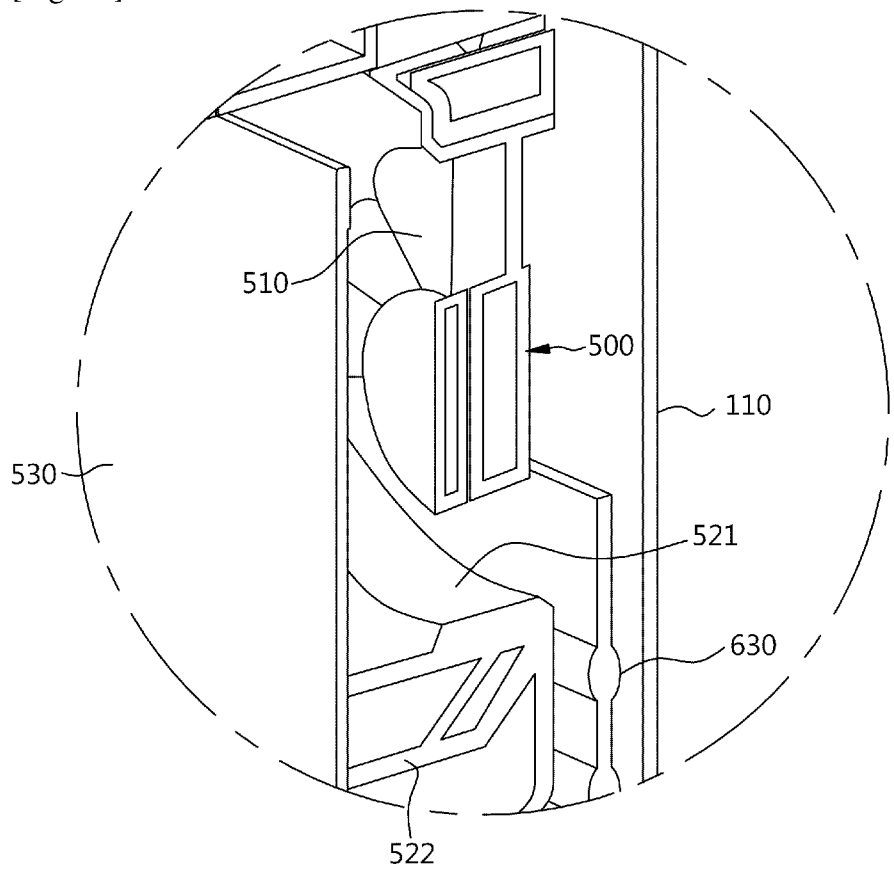
[Fig. 30]
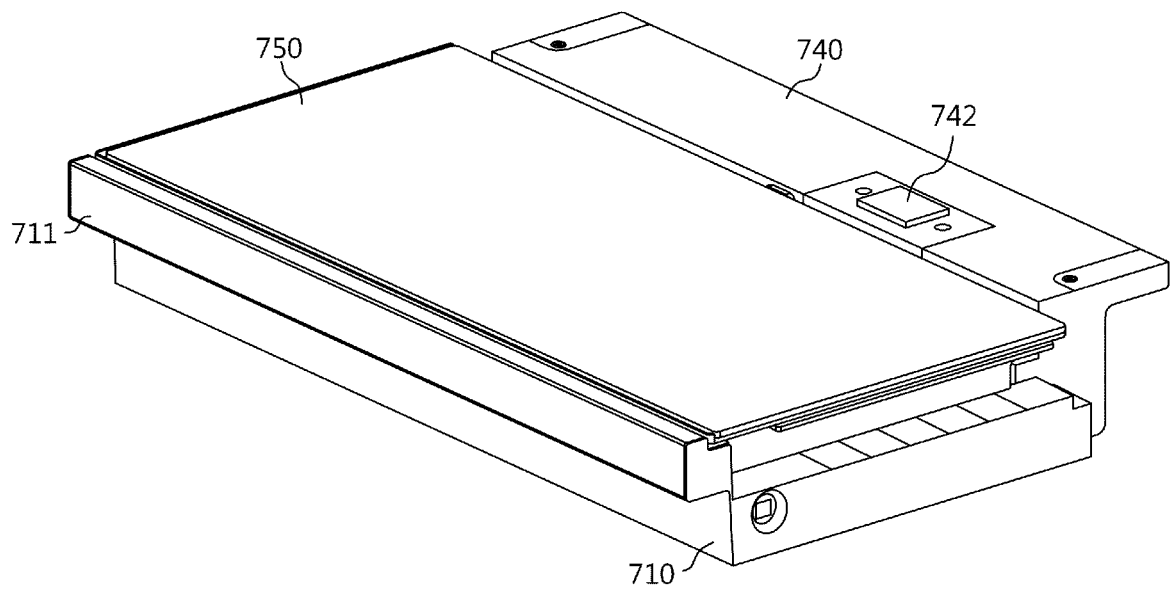

[Fig. 31]
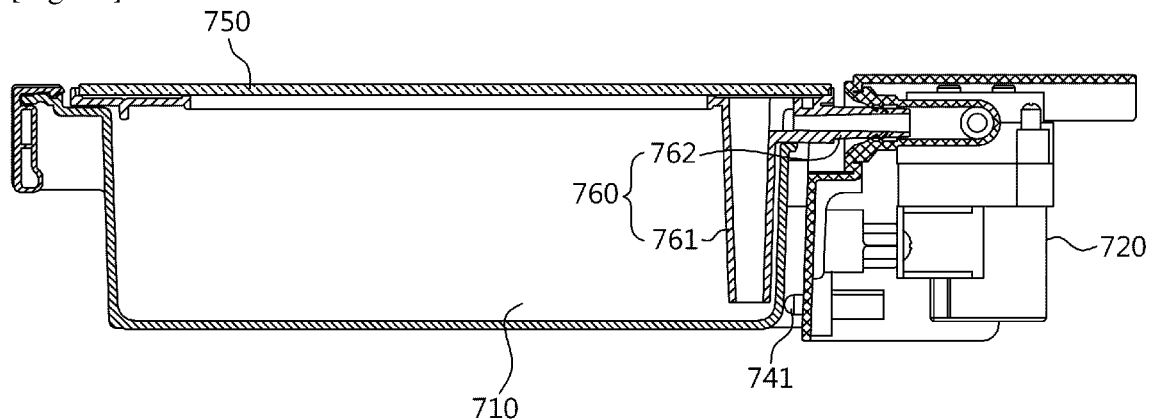
[Fig. 32]
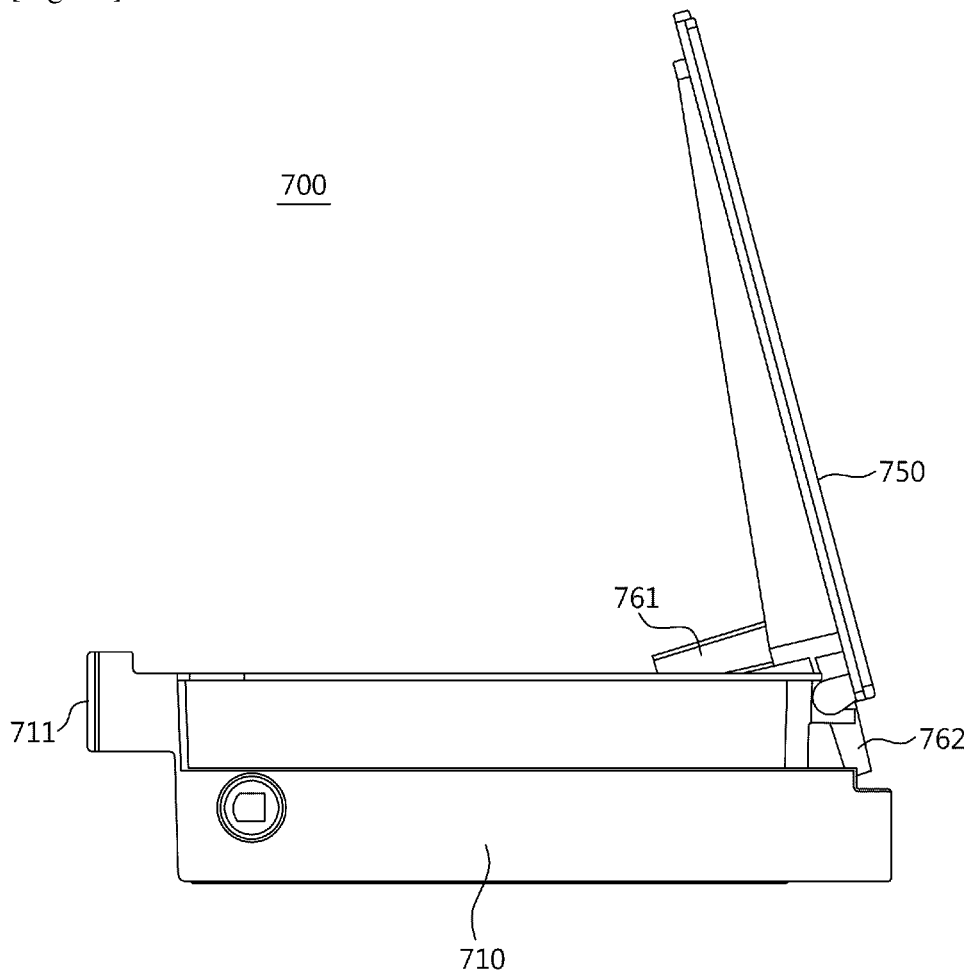

[Fig. 33]
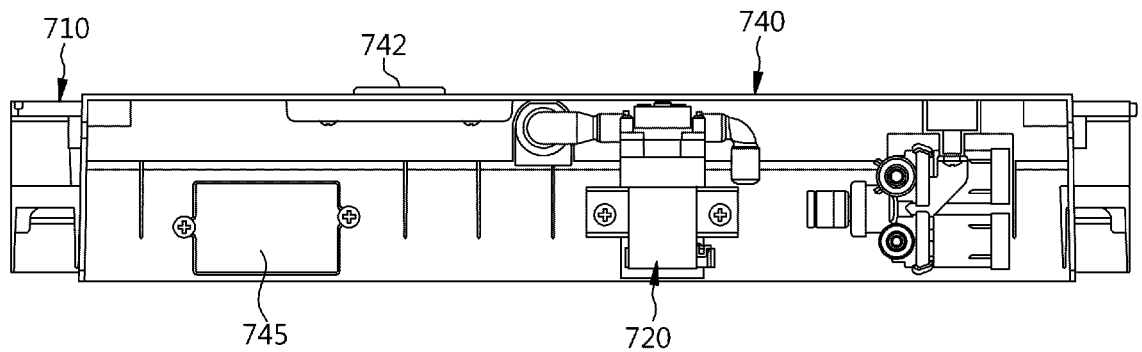
[Fig. 34]
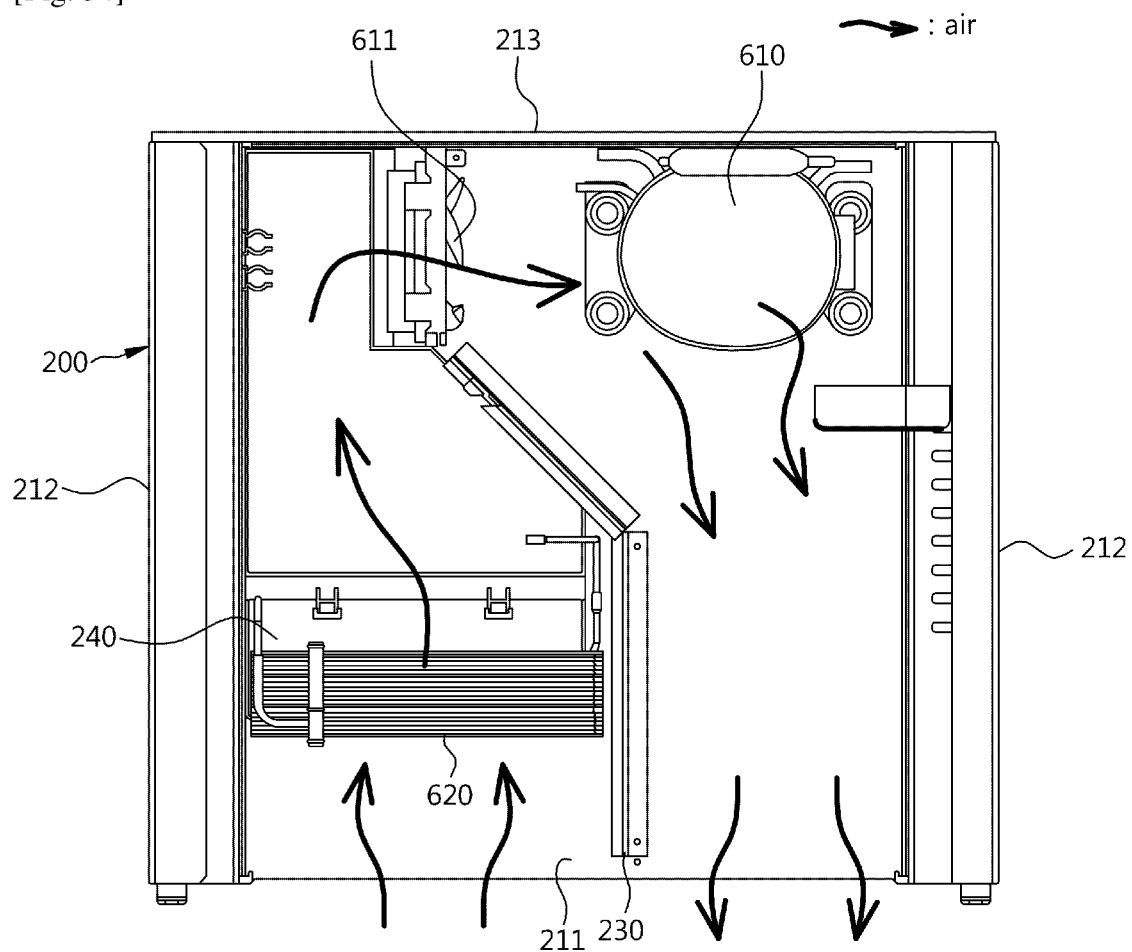

[Fig. 35]
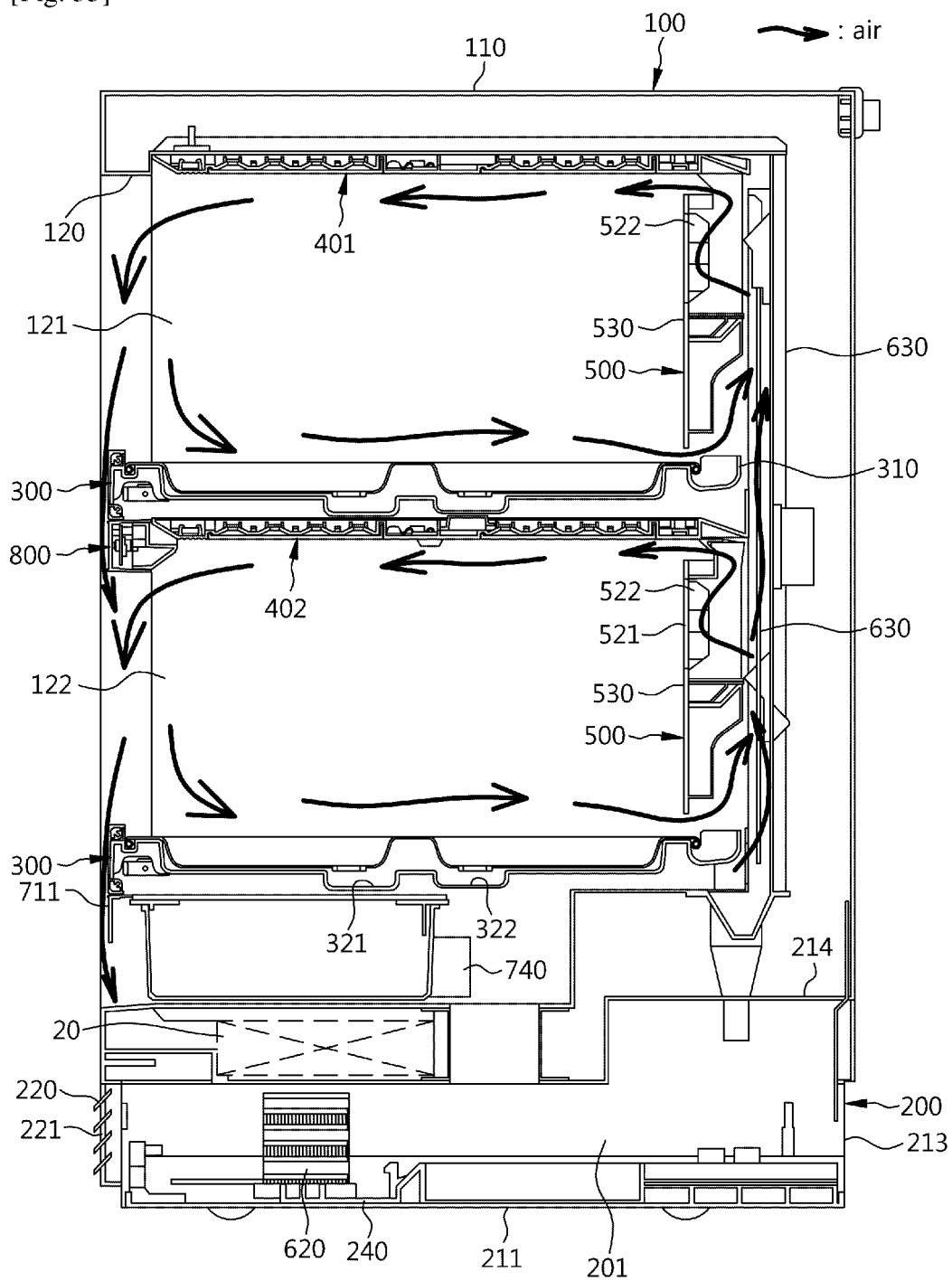

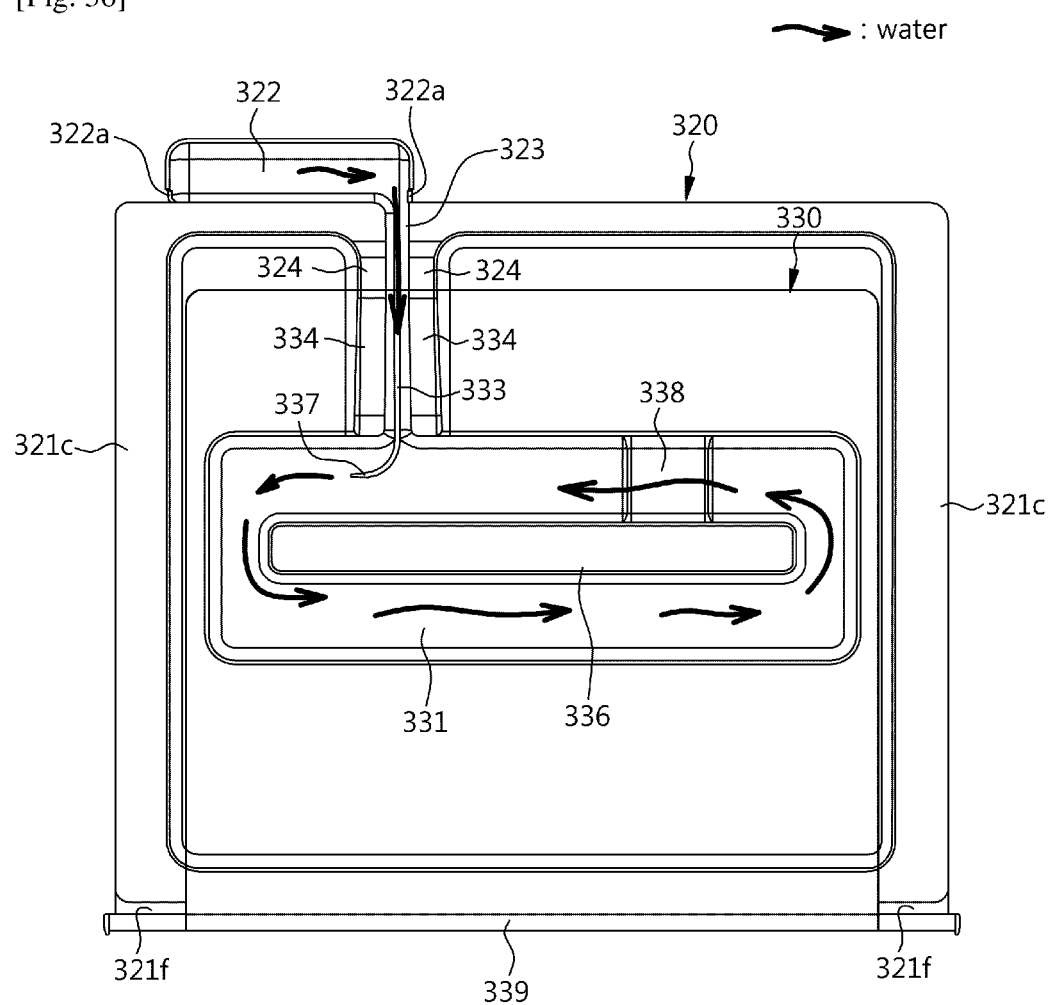
[Fig. 36]

[Fig. 37]
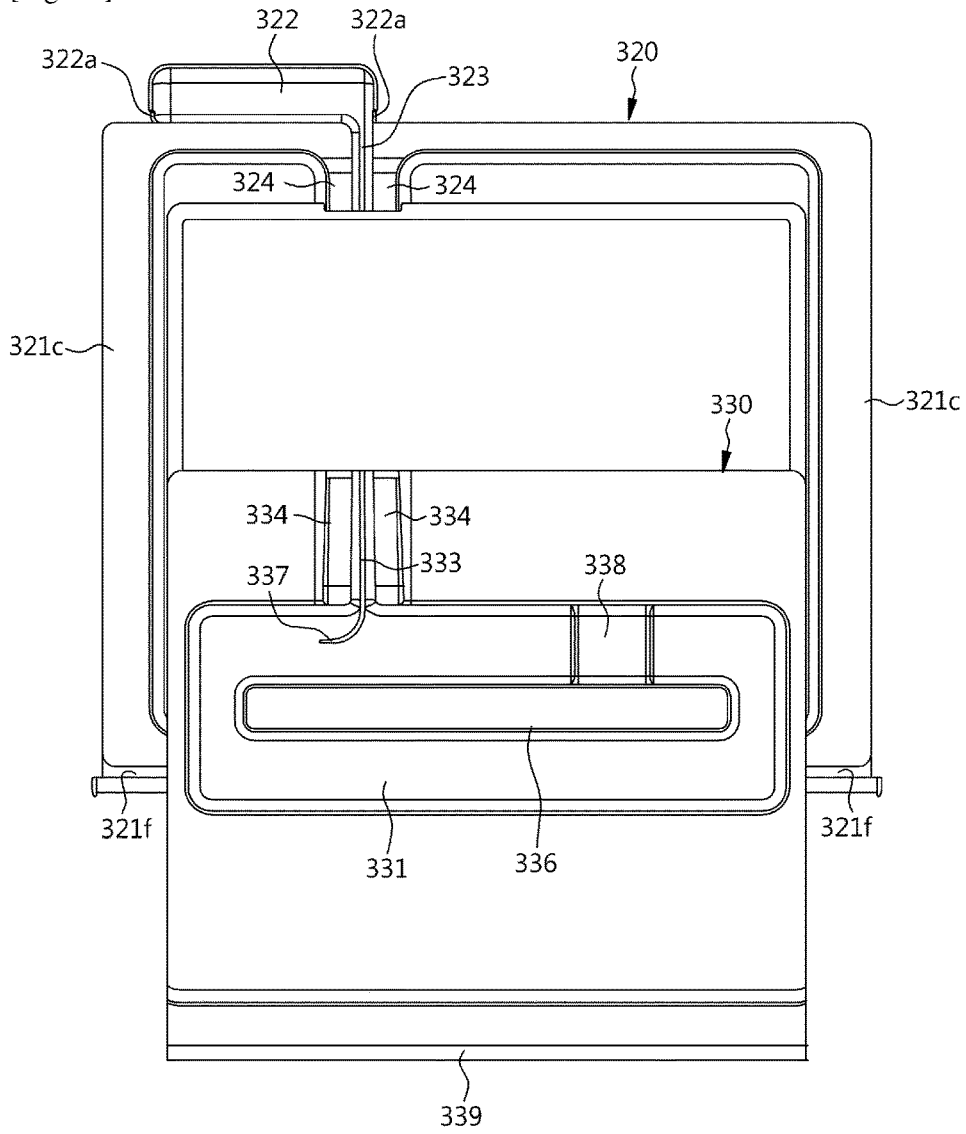
[Fig. 38]
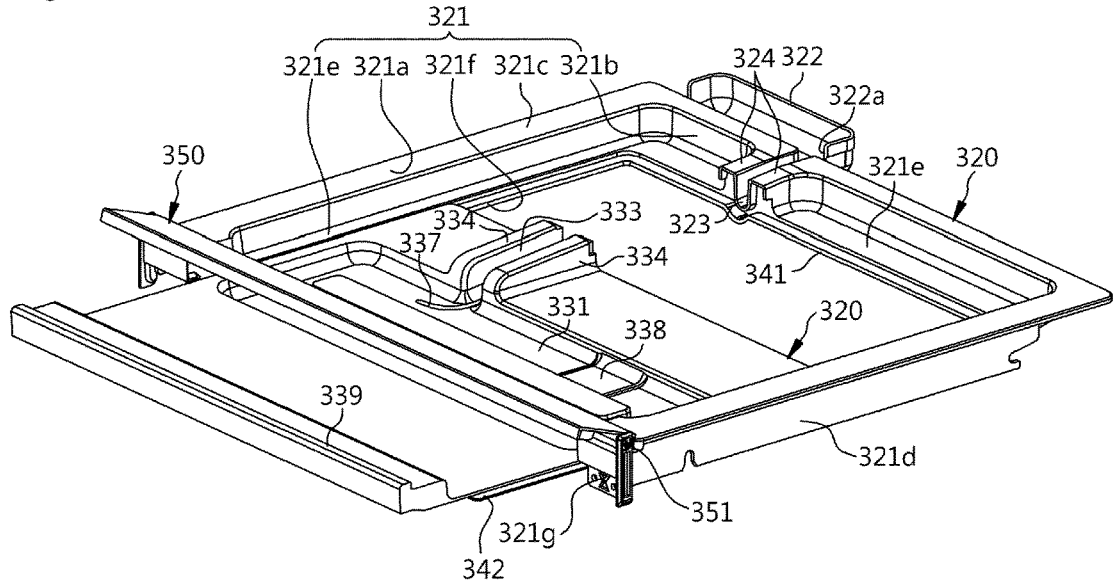

[Fig. 39]
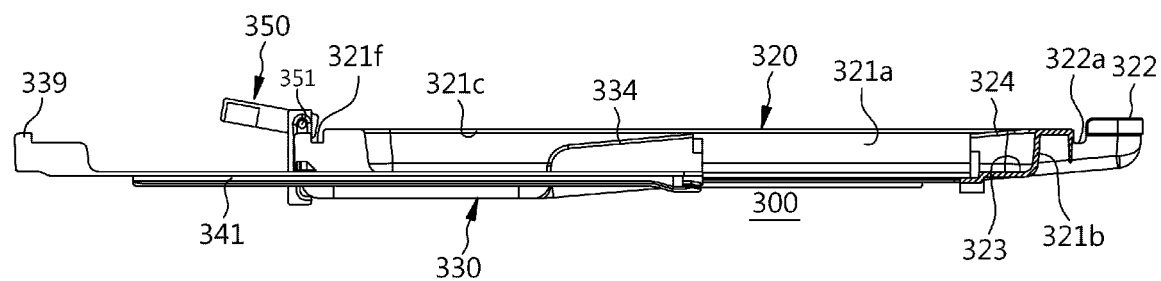

PLANT CULTIVATION APPARATUS

CROSS-REFERENCE TO RELATED PATENT APPLICATIONS

This application is a U.S. National Stage Application under 35 U.S.C. § 371 of PCT Application No. PCT/KR2020/011007, filed Aug. 19, 2020, which claims priority to Korean Patent Application No. 10-2019-0131609, filed Oct. 22, 2019, whose entire disclosures are hereby incorporated by reference.

TECHNICAL FIELD

The present disclosure relates generally to a plant cultivation apparatus capable of cultivating plants while automatically performing air circulation, light supply, and water supply.

BACKGROUND ART

Generally, a plant cultivation apparatus is a device cultivating plants in a seed state.

Recently, the plant cultivation apparatus has been provided in various forms that may easily cultivate plants indoors.

The indoor plant cultivation apparatus may be classified into a hydroponic cultivation apparatus and a soil cultivation apparatus.

The hydroponic cultivation apparatus is a device that cultivates a plant by a method in which roots of a plant are immersed in water mixed with a nutrient solution, as proposed in Korean Patent Application Publication No. 10-2012-0007420 (document 1), Korean Patent Application Publication No. 10-2012-0028040 (document 2), Korean Patent No. 10-1240375 (document 3), and Korean Patent No. 10-1422636 (document 4).

However, in the case of the hydroponic cultivation apparatus such as documents 1 to 4, when supply water in which the roots of the plant are immersed is used without continuous circulation or replacement, contamination of the supply water, such as green algae, may occur. The contamination of the supply a water may cause odor.

Further, the soil cultivation apparatus is a device using a cultivation method of planting a plant (or seeds) in soil of a pot and continuously supplying water to the pot, as proposed in Korean Patent No. 10-1400375 (document 5), Korean Utility Model Registration No. 20-0467246 (document 6), and Korean Utility Model Registration No. 20-0465385 (document 7).

In this case, compared to the hydroponic cultivation apparatus using nutrient solution, the soil cultivation apparatus may further improve growth of a plant due to nutrients in the soil and increase the growth rate of the plant.

However, in document 5, as a culture substrate and a water reservoir are provided to be spaced apart from each other, water in the water reservoir is supplied to soil in the culture substrate by an absorbing member. Thus, a cultivation place is inevitability small and the water stored in the water reservoir is easily contaminated due to a nutrient solution.

Further, in document 5, it is difficult to eject the water reservoir or the culture substrate from a case due to connection structure of the absorbing member. Thus, continuous maintenance (cleaning, etc.) of the water reservoir is not performed so that contamination and deterioration easily occur.

In documents 6 and 7, water supply is performed in a way of periodically spraying moisture into the soil (plug tray, cultivation container), so a nutrient solution splashes to the surroundings (inside of cultivation room or door) to cause contamination. Thus, water stored in a tank (nutrient tank, holdup tank) is easily contaminated due to the nutrient solution.

Further, in document 6, a bed is configured not to be ejected from the apparatus, so it is difficult to perform maintenance of the bed, such as washing, etc. Thus, contamination in the apparatus easily occurs.

In document 7, a cultivation shelf is configured to be ejected from the apparatus, so it is possible to perform maintenance as needed. However, since the cultivation shelf should be ejected together with a water tank, the cultivation shelf should be washed after the cultivation shelf and the water tank are ejected and the water tank is separated from the cultivation shelf, which is inconvenience.

In particular, the longer the storage container is in the ejected state, the longer a plant cultivated in the cultivation shelf is exposed to the outside environment, which is not good for growth of the plant, and further storage of the plant is difficult.

That is, in document 7, only when the cultivation of the plant is completed and the plant is harvested, the cultivation shelf and the water tank are ejected from the apparatus at the same time, and the cultivation shelf may be washed. However, it is difficult to perform washing or maintenance of the cultivation shelf often.

DISCLOSURE OF INVENTION

Technical Problem

Accordingly, the present disclosure has been made keeping in mind the above problems occurring in the related art, and the present disclosure is intended to provide a new type plant cultivation apparatus. Wherein the plant cultivation apparatus is configured to prevent supply water from remaining in a bed so that contamination or odor in a cultivation room which are caused by residual water is prevented.

Another objective of the present disclosure is to provide a new type plant cultivation apparatus. Wherein the plant cultivation apparatus is configured such that the bed where the supply water is supplied and a bed cover where a plant is cultivated are simultaneously ejected, or only the bed is ejected without the bed cover, so that washing or maintenance of the bed is easily performed without separation of a pod.

A further objective of the present disclosure is to provide a new type plant cultivation apparatus. Wherein the plant cultivation apparatus is configured such that a separated portion between the bed and an edge frame is not normally exposed outward, but the bed is exposed outward only when washing or maintenance of the bed is performed.

A further objective of the present disclosure is to provide a new type plant cultivation apparatus. Wherein the plant cultivation apparatus is configured such that, when the supply water is supplied into a water supply groove of the bed, the supply water does not overflow around the bed and is precisely supplied into the water supply groove.

Solution to Problem

The plant cultivation apparatus of the present disclosure may be configured such that a portion where a bed cover is placed is maintained in a state of positioning in a cultivation room together with the bed cover.

In the plant cultivation apparatus of the present disclosure, portions other than the portion where the bed cover is placed may be configured to be ejected to the outside of the cultivation room as needed. Therefore, a bed may be washed without separating a pod.

The plant cultivation apparatus of the present disclosure may have a cabinet having the cultivation room.

In the plant cultivation apparatus of the present disclosure, a water supply module may be positioned at a bottom of the cabinet.

In the plant cultivation apparatus of the present disclosure, a bed assembly may be positioned above the water supply module.

In the plant cultivation apparatus of the present disclosure, the pod may be seated on an upper surface of the bed assembly.

In the plant cultivation apparatus of the present disclosure, a lighting module may be included at an upper side of the bed assembly.

In the plant cultivation apparatus of the present disclosure, the bed assembly may include the bed cover having a seating grooved.

In the plant cultivation apparatus of the present disclosure, the bed assembly may include an edge frame receiving supply water.

In the plant cultivation apparatus of the present disclosure, the bed assembly may be configured of the edge frame and the bed that are separable from each other. Therefore, only the bed may be ejected.

In the plant cultivation apparatus of the present disclosure, the bed cover may be placed on and fastened to the edge frame constituting the bed assembly. Therefore, the bed cover may be prevented from being unintentionally ejected or separated from the bed assembly.

In the plant cultivation apparatus of the present disclosure, the bed may be configured to be ejected by sliding from the edge frame. Therefore, a user can eject the bed easily.

In the plant cultivation apparatus of the present disclosure, a water supply groove where the supply water is stored may be formed on the bed. Therefore, even when only the bed is separated from the cultivation room and washed, the cleanliness of the bed may be sufficiently maintained.

In the plant cultivation apparatus of the present disclosure, the edge frame of the bed assembly may be configured to be ejected by sliding back and forth from the cultivation room in the cabinet. Therefore, the user can eject not only the bed but also the entire bed assembly where the pod is placed to the outside of the cultivation room.

In the plant cultivation apparatus of the present disclosure, the edge frame may include an edge portion, a water reservoir, and a first water supply flow path. Therefore, the bed cover may be placed on the edge frame and the supply water may be supplied into the water supply groove of the bed.

In the plant cultivation apparatus of the present disclosure, the water reservoir may be formed by protruding from an outer wall of a rear wall surface of the edge portion. Therefore, a place where the supply water is supplied may be positioned at the rear of a cultivation space in the cultivation room so that the cultivation space may be secured as large as possible.

In the plant cultivation apparatus of the present disclosure, a placed protrusion is formed by protruding downward from the bed cover and a placing groove may be formed on the edge frame. Therefore, the bed cover in a state of being placed on the edge frame may be prevented from moving unintentionally.

In the plant cultivation apparatus of the present disclosure, the placing groove of the edge frame may be formed at a portion between the edge portion and the water reservoir. Therefore, a rear portion of the bed cover may be maintained in a stably mounted state.

In the plant cultivation apparatus of the present disclosure, the placing groove of the edge frame may be formed at front portions of opposite upper surfaces of the edge portion. Therefore, a front portion of the bed cover may be maintained in a stably mounted state.

In the plant cultivation apparatus of the present disclosure, an end of a lower portion of the placed protrusion formed at the bed cover may be formed by being rolled in a round shape. Therefore, manipulation of placing or ejecting the bed cover on or from the bed assembly may be easily performed.

In the plant cultivation apparatus of the present disclosure, a support step supporting the placed protrusion of the bed may protrude upward on a front side of an upper surface of the bed. Therefore, excessive insertion of the bed may be prevented.

In the plant cultivation apparatus of the present disclosure, the first water supply flow path may be formed by being depressed downward on an upper surface of the edge frame.

In the plant cultivation apparatus of the present disclosure, a second water supply flow path may be formed by being depressed downward on a rear portion of the upper surface of the bed. Therefore, when the supply water is supplied to the water supply groove of the bed, the supply water may be prevented from flowing around the water supply groove.

In the plant cultivation apparatus of the present disclosure, the first water supply flow path and the second water supply flow path may be formed to be inclined downward from the water reservoir to the height of a surface of the water supply groove formed on the bed. Therefore, the supply water supplied to the water reservoir may be smoothly supplied to the water supply groove.

In the plant cultivation apparatus of the present disclosure, first bank parts may be formed by protruding on opposite sides of a depressed portion having the first water supply flow path in the upper surface of the edge frame. Therefore, the supply water may be prevented from overflowing to the surroundings while flowing along the first water supply flow path.

In the plant cultivation apparatus of the present disclosure, second bank parts may be formed by protruding on opposite sides of a depressed portion having the second water supply flow path in the upper surface of the bed. Therefore, the supply water may be prevented from overflowing to the surroundings while flowing along the second water supply flow path.

In the plant cultivation apparatus of the present disclosure, the bed constituting the bed assembly may have the handle groove. Therefore, the user can separate the bed from the edge frame easily.

In the plant cultivation apparatus of the present disclosure, the handle groove may be formed by being depressed upward from a lower surface of a front end of the bed. Therefore, the handle groove may be not exposed outward and be easily gripped.

In the plant cultivation apparatus of the present disclosure, the edge frame may be configured to provide a circumferential portion of the bed assembly.

In the plant cultivation apparatus of the present disclosure, the bed may be configured to provide a bottom portion of the bed assembly. Therefore, as the edge frame and the bed are coupled to each other, the bed assembly may be formed in a tray shape.

In the plant cultivation apparatus of the present disclosure, facing surfaces between the edge frame and the bed that constitute the bed assembly may be configured to be engaged with each other. Therefore, the edge frame and the bed may be a single body or may be separated from each other as needed.

In the plant cultivation apparatus of the present disclosure, a protrusion may be formed by protruding from each of opposite inner surfaces and a rear inner surface of the edge frame.

In the plant cultivation apparatus of the present disclosure, a depressed portion may being formed by being depressed from each of opposite inner surfaces and a rear inner surface of the bed. Therefore, the edge frame and the bed may be airtightly coupled to each other.

In the plant cultivation apparatus of the present disclosure, a front cover body that blocks the front surface of the bed may be provided at the front surface of the edge frame. Therefore, unless the bed is ejected, the coupled portion between the bed and the edge frame may be prevented from being exposed into the cultivation room.

In the plant cultivation apparatus of the present disclosure, the front cover body may be configured to be rotatable. Therefore, the front cover body may be selectively opened as needed.

Advantageous Effects of Invention

As described above, the plant cultivation apparatus of the present disclosure may have various effects as follows.

In the plant cultivation apparatus of the present disclosure, the bed assembly may be configured to take over the role of a partition wall dividing each cultivation room, so that the size of the cultivation place can be maximized.

Further, in the plant cultivation apparatus of the present disclosure, since the supply water supplied to the water supply groove of the bed may not be supplied over a predetermined level (height enough to be sensed by the water level sensor), the supply water may be supplied to the pod in a way that frequently supplies only the required amount of water.

Therefore, occurrence of residual water in the water supply groove can be prevented, and contamination or odor in the cultivation room due to the residual water can be prevented.

Further, in the plant cultivation apparatus of the present disclosure, the bed cover on which the pod is seated may be ejected from the cultivation room as needed. Therefore, operation such as replacement of the pod, etc. can be easily performed.

Further, in the plant cultivation apparatus of the present disclosure, the bed cover on which the pod is seated may not be ejected, but only the bed may be ejected. Therefore, washing or maintenance of the bed can be easily performed.

Further, in the plant cultivation apparatus of the present disclosure, the separated portion between the bed and the edge frame may not be exposed outward by the front cover body. Therefore, since the door may be formed of a transparent material such as glass, the exterior design of the plant cultivation apparatus can be enhanced.

Further, in the plant cultivation apparatus of the present disclosure, the bed may be exposed outward only when washing or maintenance of the bed is performed, by the front cover body. Therefore, the bed can be prevented from being unexpectedly ejected.

Further, in the plant cultivation apparatus of the present disclosure, when supply water is supplied into the water supply groove, the supply water can be prevented from overflowing around the bed by the structures of the water supply flow path and the bank parts. Therefore, water supply can be smoothly performed.

BRIEF DESCRIPTION OF DRAWINGS

The above and other objectives, features, and other advantages of the present disclosure will be more clearly understood from the following detailed description when taken in conjunction with the accompanying drawings, in which:

FIG. 1 is an exploded-perspective view showing a plant cultivation apparatus according to an embodiment of the present disclosure;

FIG. 2 is a perspective view showing the exterior of the plant cultivation apparatus according to the embodiment of the present disclosure, the plant cultivation apparatus in a state in which a door of the plant cultivation apparatus is closed;

FIG. 3 is a perspective view showing the exterior of the plant cultivation apparatus according to the embodiment of the present disclosure, the plant cultivation apparatus in a state in which the door thereof is opened;

FIG. 4 is an exploded-perspective view showing a pod of the plant cultivation apparatus according to the embodiment of the present disclosure;

FIG. 5 is a front section view showing the pot of the plant cultivation apparatus according to the embodiment of the present disclosure;

FIG. 6 is a side section view showing the plant cultivation apparatus according to the embodiment of the present disclosure;

FIG. 7 is a sectioned-perspective view showing an internal structure of the plant cultivation apparatus according to the embodiment of the present disclosure;

FIG. 8 is a perspective view showing an internal structure of a machine chamber of the plant cultivation apparatus according to the embodiment of the present disclosure;

FIG. 9 is a plan view showing the internal structure of the machine chamber of the plant cultivation apparatus according to the embodiment of the present disclosure;

FIG. 10 is an exploded-perspective view showing a bed assembly of the plant cultivation apparatus according to the embodiment of the present disclosure;

FIG. 11 is an assembled-section view showing the bed assembly of the plant cultivation apparatus according to the embodiment of the present disclosure;

FIG. 12 is an enlarged view of part "A" in FIG. 7;

FIG. 13 is a side section view showing a bed cover of the bed assembly of the plant cultivation apparatus according to the embodiment of the present disclosure;

FIG. 14 is a perspective view showing an installation state between an edge frame and a bed of the bed assembly of the plant cultivation apparatus according to the embodiment of the present disclosure;

FIG. 15 is a plan view showing the edge frame of the bed assembly of the plant cultivation apparatus according to the embodiment of the present disclosure;

FIG. 16 is a perspective view from the front side top showing the edge frame of the bed assembly of the plant cultivation apparatus according to the embodiment of the present disclosure;

FIG. 17 is a side section view showing the edge frame of the bed assembly of the plant cultivation apparatus according to the embodiment of the present disclosure;

FIG. 18 is a plan view showing the bed of the bed assembly of the plant cultivation apparatus according to the embodiment of the present disclosure;

FIG. 19 is a side view showing the bed of the bed assembly of the plant cultivation apparatus according to the embodiment of the present disclosure;

FIG. 20 is a side section view showing the bed of the bed assembly of the plant cultivation apparatus according to the embodiment of the present disclosure;

FIG. 21 is a rear view showing the bed of the bed assembly of the plant cultivation apparatus according to the embodiment of the present disclosure;

FIG. 22 is a plan view showing an installation state between the edge frame and the bed of the bed assembly of the plant cultivation apparatus according to the embodiment of the present disclosure;

FIG. 23 is a side section view showing the installation state between the edge frame and the bed of the bed assembly of the plant cultivation apparatus according to the embodiment of the present disclosure;

FIG. 24 is an enlarged view showing part "B" in FIG. 7, the view showing an installation state of the pod of the bed assembly of the plant cultivation apparatus according to the embodiment of the present disclosure;

FIG. 25 is a perspective view showing a lighting module of the plant cultivation apparatus according to the embodiment of the present disclosure, the view from an upper side thereof;

FIG. 26 is a perspective view showing a partial cut state of the lighting module of the plant cultivation apparatus according to the embodiment of the present disclosure;

FIG. 27 is a perspective view showing the lighting module of the plant cultivation apparatus according to the embodiment of the present disclosure, the view from a lower side thereof;

FIG. 28 is a section view showing the lighting module of the plant cultivation apparatus according to the embodiment of the present disclosure;

FIG. 29 is an enlarged view showing part "C" in FIG. 7, the view showing a circulation fan assembly of the plant cultivation apparatus according to the embodiment of the present disclosure;

FIG. 30 is a perspective view showing an exterior structure of a water supply module of the plant cultivation apparatus according to the embodiment of the present disclosure;

FIG. 31 is a side section view showing an interior structure of the water supply module of the plant cultivation apparatus according to the embodiment of the present disclosure;

FIG. 32 is a side view showing a state in which the door of the water supply module of the plant cultivation apparatus according to the embodiment of the present disclosure is opened;

FIG. 33 is a rear view showing a state in which a water pump is coupled to an installation frame of the water supply module of the plant cultivation apparatus according to the embodiment of the present disclosure;

FIG. 34 is a plan view showing air flow flowing into a machine chamber of the plant cultivation apparatus according to the embodiment of the present disclosure;

FIG. 35 is a side section view showing the air flow flowing in the plant cultivation apparatus according to the embodiment of the present disclosure;

FIG. 36 is a plan view showing a state in which the supply water is supplied into the bed of the plant cultivation apparatus according to the embodiment of the present disclosure;

FIG. 37 is a plan view showing a state in which the bed is separated from the edge frame of the plant cultivation apparatus according to the embodiment of the present disclosure;

FIG. 38 is a perspective view showing the state in which the bed is separated from the edge frame of the plant cultivation apparatus according to the embodiment of the present disclosure;

FIG. 39 is a side section view showing the state in which the bed is separated from the edge frame of the plant cultivation apparatus according to the embodiment of the present disclosure.

MODE FOR THE INVENTION

Hereinbelow, an exemplary embodiment of a plant cultivation apparatus of the present disclosure will be described with reference to FIGS. 1 to 39.

FIG. 1 is an exploded-perspective view showing the plant cultivation apparatus according to the embodiment of the present disclosure. FIG. 2 is a perspective view showing the exterior of the plant cultivation apparatus according to the embodiment of the present disclosure, the plant cultivation apparatus in a state in which a door of the plant cultivation apparatus is closed. FIG. 3 is a perspective view showing the plant cultivation apparatus according to the embodiment of the present disclosure, the plant cultivation apparatus in a state in which a door thereof is opened.

As described in the drawings, the plant cultivation apparatus according to the embodiment of the present disclosure includes: a cabinet 100; a machine chamber frame 200; a bed assembly 300 on which a pod 10 is seated. In particular, the bed assembly 300 may be configured such that a bed 330 is selectively ejected from an edge frame 320 on which a bed cover 310 is seated, so that it may be possible to wash the bed 330 without separating the pod 10 from the bed 330.

The plant cultivation apparatus will be described for each configuration.

The pod 10 will be described with reference to FIGS. 4 and 5.

The pod 10 may be formed in an upward open container.

A bed soil 11 containing the nutrient solution (not shown) may be filled in the pod 10.

The nutrient solution may be a material containing a nutrient that is supplied to a plant to grow better. The nutrient solution may be provided in a water-soluble capsule form that gradually dissolves in water, so that the nutrient solution may be contained in the supply water while gradually dissolving every time when the supply water is supplied.

In addition, a seed paper 12 may be provided on an upper surface of the bed soil 11. The seed paper 12 may be a part where seeds are planted in a predetermined arrangement, and when the supply water is supplied to the seed paper 12 seated on the upper surface of the bed soil 11, the seed paper 12 may completely dissolve and the seeds may remain on the bed soil 11.

A brick 13 may be provided on an upper surface of the seed paper 12.

The brick 13 may be configured to control moisture and humidity of soil and to prevent mold growth, and be formed by processing mineral ore such as vermiculite into a powder form and then compressing the powder.

An upper surface of the pod 10 may be covered with a protection sheet 15, thereby protecting the inside thereof.

In particular, a packing member 14 may be provided between an upper surface of the brick 13 and the protection sheet 15, so that the brick 13 may be protected from the outside environment.

A type of a plant to be cultivated may be printed on a surface of the protection sheet 15.

Meanwhile, a protrusion 16 may be formed downward on a lower surface of the pod 10 and the protrusion 16 may be formed in a container body in which a water flow hole 16a may be provided at an lower surface thereof. The protrusion 16 may be formed in a hollow pipe structure that is open vertically and empty inside.

Further, a first absorber member 17 absorbing the supply water supplied to the bed 330 may be provided in the protrusion 16, and a flat plate shaped second absorber member 18 may be provided between the first absorber member 17 and the bed soil. The second absorber member 18 may serve to uniformly supply the supply water absorbed by the first absorber member 17 to the entire portion of the bed soil 11.

Next, the cabinet 100 will be described with reference to FIGS. 1 to 3.

The cabinet 100 may be a part that provides the exterior of the plant cultivation apparatus.

The cabinet 100 may be formed in a container body that is open forward, and include an outer case 110 providing an outer wall surface thereof and an inner case 120 providing an inner wall surface.

Herein, the outer case 110 may be formed in a container body that is closed at an upper surface thereof and open at a lower surface and a front surface thereof.

The inner case 120 may be positioned in the outer case 110 while being spaced apart from the outer case 110. A foam insulation (not shown) may be filled between the inner case 120 and the outer case 110.

A cultivation room 121, 122 may be provided in the inner case 120. The cultivation room 121, 122 may be a place where the plant are grown.

The cultivation room 121, 122 may include an upper cultivation room 121 and a lower cultivation room 122, and each of the two cultivation rooms 121 and 122 may be configured to have a separate space.

The cabinet 100 may have a door 130 at a front surface thereof.

The door 130 may be configured to open and close the cultivation room 121, 122 of the cabinet 100.

That is, as the door 130 is provided in the cabinet 100, the plant cultivation apparatus according to the embodiment of the present disclosure may be a closed-type cultivation apparatus. In particular, in the case of the closed-type cultivation apparatus, the plant cultivation apparatus may cultivate the plant while providing a sufficient amount of light and maintaining a predetermined temperature therein by a lighting module 401, 402, a circulation fan assembly 500, and a temperature control module 600, which will be described below.

Meanwhile, the door 130 may be one of a rotary type opening and closing structure and a sliding type opening and closing structure, and may be configured to block the front surface of the cabinet 100.

In the embodiment of the present disclosure, the door 130 is configured as the rotary type opening and closing structure.

The door 130 may include a door frame 131 having a rectangular frame structure with an empty inside portion and a sight glass 132 blocking the empty inside portion of the door frame 131.

Preferably, the sight glass 132 may be formed of a transparent material, for example, may be formed of glass.

When the sight glass 132 is formed of glass, a protecting film (not shown) may be attached on the glass. The protecting film may be a light shading film (partially shading) that minimizes the leakage of light from the cultivation room indoors.

Instead of the protecting film, the sight glass 132 may have a dark color, so that the leakage of light indoors may be minimized.

Further, the door 130 may be configured of only the sight glass 132 without the door frame 131.

Next, the machine chamber frame 200 will be described with reference to FIGS. 8 and 9.

The machine chamber frame 200 may constitute a bottom portion of the plant cultivation apparatus according to the embodiment of the present disclosure.

The machine chamber frame 200 may be extended from a lower portion of the outer case 110. The machine chamber frame 200 may include a bottom plate 211 constituting a bottom of the machine chamber frame 200, side surface plates 212 constituting opposite side surfaces thereof, a rear surface plate 213 constituting a rear surface thereof, and an upper surface plate 214 constituting an upper surface thereof. That is, the machine chamber frame 200 may be formed in a box shaped structure that has an open front surface.

The machine chamber frame 200 may be configured such that an open lower surface of the outer case 110 is placed thereon and is coupled thereto.

The machine chamber frame 200 and the inner case 120 may be disposed to be spaced apart from each other and the side surface plates 212 and the rear surface plate 213 of the machine chamber frame 200 may be respectively configured to be connected to opposite side surfaces and a rear surface of the outer case 110.

Further, the inside of the machine chamber frame 200 may be configured as a machine chamber 201.

That is, the machine chamber 201 and the cultivation room 121, 122 may be configured as a space in the machine chamber frame 200 and a space in the inner case 120, respectively, so that the machine chamber 201 and the cultivation room 121, 122 may be configured as spaces separated from each other.

A part of components of the temperature control module 600, which will be described below, may be provided in the machine chamber 201.

Although not shown in the drawings, the inner case 120 and the machine chamber frame 200 may be formed in a singly body. In this case, a separate partition may be provided between the cultivation room 121, 122 and the machine chamber 201 so that the cultivation room 121, 122 and the machine chamber 201 may be separated from each other.

Further, an intake and exhaust grill 220 may be provided on the open front surface of the machine chamber frame 200 that is the front of the machine chamber 201. That is, the intake and exhaust grill 220 may serve to guide air flow suctioned from the indoor into the machine chamber 201 or air flow discharged from the machine chamber 201 to the indoor and to block an open front surface of the machine chamber 201.

In addition, the intake and exhaust grill 220 may have an inlet 221 and an outlet 222. The inlet 221 and the outlet 222 may be separated from each other by being arranged at positions divided by a partition 230, which will be described below. In the embodiment of the present disclosure, the inlet 221 and the outlet 222 may be distinguished as the inlet 221 at the left and the outlet 222 at the right, when viewed from the front of the plant cultivation apparatus.

Further, the partition 230 dividing the inside of the machine chamber 201 into left and right sides may be provided in the machine chamber frame 200. That is, flow paths through which air flows into and is discharged from the machine chamber 201 may be divided by the partition 230.

A flow path through which air flows into the machine chamber 201 may be positioned in the inlet 221 of the intake and exhaust grill 220, and a flow path through which air is discharged from the machine chamber 201 may be positioned in the outlet 222 thereof.

In addition, the opposite sides in the machine chamber 201 which are divided by the partition 230 may be configured to communicate with each other at a rear portion of the machine chamber 201. That is, a rear end portion of the partition 230 may be spaced apart from a rear wall surface in the machine chamber 201 without contacting therewith, so that the opposite sides divided from each other may communicate with each other.

Although not shown in the drawings, an open hole (not shown) may be provided in the rear end portion of the partition 230 to allow the opposite sides in the machine chamber 201 to communicate with each other.

Further, the partition 230 may be formed in a straight line shape, and may be formed in an inclined structure or a bent structure. In the embodiment of the present disclosure, the partition 230 is formed in the bent structure. That is, the partition 230 is partially bent, so that a condenser 620 and a compressor 610, which will be described later, may be formed as large as possible.

Further, a condensed water reservoir 240 may be provided in the machine chamber 201 of the machine chamber frame 200. The condensed water reservoir 240 that is described above may be positioned at a bottom at the side where air flows into the machine chamber 201 through the inlet 221, and may serve to receive condensed water flowing down from the condenser 620 and to fix the condenser 620 in the machine chamber.

Further, a heat exhaust opening 202 may be formed by penetrating the rear surface plate 213 of the machine chamber frame 200. The heat exhaust opening 202 may be a hole provided to discharge (or suction) air dissipating heat of the compressor 610, which will be described below. That is, through additional provision of the heat exhaust opening 202, the discharge of air may be smoothly performed.

The bottom plate 211 of the machine chamber frame 200 may have a discharge hole (not shown) that is provided to discharge the air dissipating heat of the compressor 610.

Meanwhile, a rear portion of the upper surface plate 214 providing an upper surface of the machine chamber frame 200 may be formed by protruding upward more than other portions thereof, so that a rear portion of the inside of the machine chamber 201 may be higher than other portions thereof. That is, considering a protruding height of the compressor 610 provided in the machine chamber 201, the rear portion of the machine chamber 201 may be formed higher than the other portions thereof.

Further, a controller 20 (referring to FIG. 6) may be provided at a front portion between an upper surface of the upper surface plate 214 and a lower surface of the inner case 120, the lower surface thereof facing the upper surface of the upper surface plate 214, the controller 20 being provided to control operation of each component of the plant cultivation apparatus. A circuit board having various control circuits may constitute the controller 20.

Next, the bed assembly 300 will be described with reference to FIGS. 10 to 24.

The bed assembly 300 may be a part provided to place the pod 10 thereon, so that the plant is cultivated in the pod 10.

The bed assembly 300 may be provided in the cultivation room 121, 122 of the cabinet 100. In particular, first guide rails 101 (referring to FIG. 1) may be respectively provided on opposite wall surfaces (opposite wall surfaces in the inner case) in the cultivation room 121, 122. The first guide rails 101 may guide the bed assembly 300 to be moved back and forth so that the bed assembly 300 may be ejected from the cultivation room 121, 122 in the drawer manner.

The bed assembly 300 may include the bed cover 310, the edge frame 320, and the bed 330. In particular, the edge frame 320 and the bed 330 may be configured to be separable from each other and the bed 330 may be configured to be ejected forward from the edge frame 320.

The above structure will be described in detail for each component as follows.

First, the bed cover 310 may be a part where the pod 10 is seated to be placed in an original position thereof.

A placed step 311 may be formed by protruding outward from an upper circumference of the bed cover 310 and a plurality of seating grooves 312 and 313 may be provided inside the bed cover 310 for seating of the pod 10. This structure is as shown in FIGS. 10 and 13.

Each of the seating grooves 312 and 313 may have the same width as the pod 10 and may be formed by being depressed from a bottom surface in the bed cover 310 to a depth such that the pod 10 may be partially inserted therein.

Preferably, the bed cover 310 may be formed of a metal material. In particular, the bed cover 310 may be preferably formed of stainless steel to prevent corrosion.

In addition, a penetration hole 312a, 313a may be provided in each of the seating grooves 312 and 313 so that an absorbing tube 16 of the pod 10 penetrates the penetration hole 312a, 313a. That is, a user can place the pod 10 in the original position thereof by checking a position of the penetration hole 312a, 313a and a position of the absorbing tube 16.

In particular, the seating grooves 312 and 313 may include a front row seating groove 312 where each front pod 10 is seated and a rear row seating groove 313 where each rear pod 10 is seated.

At this time, a penetration hole 312a of the front row seating groove 312 and a penetration hole 313a of the rear row seating groove 313 may be arranged adjacent to each other. That is, when the bed cover 310 is placed on the edge frame 320, each of the penetration holes 312a and 313a may be configured to be respectively positioned at a front side and a rear side in a water supply groove 331 provided in the bed 330.

Further, the bed cover 310 may have the placed protrusion 314 that is formed by protruding downward from an end portion constituting the placed step 311. The placed protrusion 314 may be configured to be placed on a placing groove 322a, 321f provided in the edge frame 320 and to support the bed cover 310 to be maintained in the original position thereof.

In particular, an end of a lower portion of the placed protrusion 314 may be rolled to be rounded. That is, as the end of the placed protrusion 314 is formed to be rounded, finger injury of the user may be prevented, and even when the user places the bed cover roughly on the bed, the bed cover may be placed in the original position thereof.

Further, the penetration hole 312a, 313a provided in each of the seating grooves 312 and 313 may be a regular hole, or may be an opening portion that is formed by lancing.

Next, the edge frame 320 may be configured to provide a circumferential portion of the bed assembly 300.

The edge frame 320 may be configured to be drawable while sliding back and forth from the cultivation room 121, 122 in the cabinet 100. That is, by ejecting the edge frame 320, all of the bed assembly 300 and each pod 10 placed on the bed assembly 300 may be ejected from the cultivation room 121, 122.

As shown in FIG. 10, and 15 to 17, the edge frame 320 may include an edge portion 321.

The edge portion 321 may be formed in a rectangular frame structure that is open at a front surface thereof and includes opposite side wall ends 321a constituting opposite wall surfaces of the structure and a rear wall end 321b constituting a rear wall surface thereof. A placing end 321c that constitutes an upper wall surface of the edge portion 321 may be bent outward from an upper end of each of the opposite side wall ends 321a and the rear wall end 321b, and the placed step 311 of the bed cover 310 may be placed on the placing end 321c.

In addition, a rail guide 321d may be provided on each of outer wall surfaces of the opposite side wall ends 321a to be moved back and forth along each of the first guide rails 101 provided on the opposite wall surfaces in the cultivation room 121, 122. That is, by structures of the rail guide 321d and the first guide rail 101, the entire bed assembly 300 such as the edge frame 320, the bed cover 310 placed on the edge frame 320, and the bed 330 coupled to the edge frame 320 may be integrally ejected or retracted.

At each of lower ends of the opposite side wall ends 321a and the rear wall end 321b of the edge portion 321, a circumferential bottom 321e providing a circumferential portion of a bottom of the bed assembly 300 may be provided. The circumferential bottom 321e may provide the bottom of the bed assembly 300 together with the bed 330, and be configured as a portion that is coupled with the bed 330.

Further, the edge frame 320 may include a water reservoir 322.

The water reservoir 322 may be a part where the supply water is supplied.

The water reservoir 322 may be extended rearward from an outer surface (rear surface) of the rear wall end 321b of the edge portion 321.

In addition, the water reservoir 322 may be formed in a container body that is open at an upper surface thereof and has a circumference and a bottom, and the bottom of the water reservoir 322 may be inclined downward or may be rounded from one side to another side. A first water supply flow path 323, which will be described below, may be connected to a lowest portion of the bottom of the water reservoir 322.

Further, a first placing groove 322a may be provided in a portion of being connected with the edge portion 321 of an upper surface of the water reservoir 322. The first placing groove 322a may be a portion where a placed protrusion 314 provided in a rear side of the bed cover 310 is received.

In addition, a second placing groove 321f may be provided in each of front portions of upper surfaces of the opposite side wall ends 321a constituting the edge portion 321. The second placing groove 321f may be a portion where a placed protrusion 314 provided in a front side of the bed cover 310 is received.

That is, the placed protrusions 314 provided in the front and rear sides of the bed cover 310 may be respectively placed on the first and second placing grooves 322a and 321f to prevent back and forth movement of the bed cover 310, so that the bed cover 310 may be stably mounted.

Further, the edge frame 320 may include the first water supply flow path 323.

The first water supply flow path 323 may be configured to guide the supply water supplied to the water reservoir 322 into the bed 330.

The first water supply flow path 323 may be formed such that a portion from one side of the water reservoir 322 to the bed 330 in an upper surface of the edge portion 321 constituting the edge frame 320 is formed by being depressed downward.

That is, the supply water in the water reservoir 322 may be supplied into the bed 330 along the first water supply flow path 323.

In particular, it may be preferably that the first water supply flow path 323 is inclined downward as the first water supply flow path 323 goes from the bottom in the water reservoir 322 to the bed 330.

In addition, first bank parts 324 protruding upward may be respectively provided in portions of the upper surface of the edge portion 321, the portions at opposite sides of the portion where the first water supply flow path 323 is formed by being depressed.

That is, the supply water flowing along the first water supply flow path 323 may be prevented from overflowing from the first water supply flow path 323 by the first bank parts 324. The height of each of the first bank parts 324 may be approximately the same as the height of the water reservoir 322 and may be inclined downward as the first bank part 324 goes forward. The inclination of the first bank part 324 may be the same as the inclination of the first water supply flow path 323.

Next, the bed 330 may constitute the bottom of the bed assembly 300.

The bed 330 may be configured to be ejected while sliding from the edge frame 320 (referring to FIGS. 37 to 39). That is, only the bed 330 may be ejected from the cultivation room 121, 122, according to the needs of the user. Whereby, the bed 330 may be washed without separation of each pod 10.

As shown in FIGS. 18 to 21, the bed 330 may be formed in a plat plate structure, and the water supply groove 331 may be formed by being depressed on an inside portion of the bed 330.

The water supply groove 331 may be a part for providing the supply water to each pod 10.

In particular, a second water supply flow path 333 may be provided on an upper surface of the bed 330. The second water supply flow path 333 may guide the supply water supplied from the first water supply flow path 323 constituting the edge frame 320 to be supplied into the water supply groove 331.

The second water supply flow path 333 may be formed by being depressed on a portion at a rear side of the upper surface of the bed 330, the portion from a portion connected to the first water supply flow path 323 to the water supply groove 331.

In addition, second bank parts 334 protruding upward may be provided in portions of the upper surface of the bed 330, the portions at opposite sides of the portion where the second water supply flow path 333 is formed by being depressed.

That is, the supply water flowing along the second water supply flow path 333 may be prevented from overflowing from the second water supply flow path 333 by the second bank parts 334. The height of each of the second bank parts 334 may be the same as the height of the first bank parts 324 and may be inclined downward as the second bank part 334 goes forward. The inclination of the second bank part 334 may be approximately the same as the inclination of the second water supply flow path 333.

In addition, a protrusion 341 (referring to FIGS. 15 and 16) and a depressed portion 342 (referring to FIGS. 19 to 21) that are engaged with each other may be respectively provided on opposite surfaces between the bed 330 and the edge frame 320.

That is, as the protrusion 341 and the depressed portion 342 are engaged with each other, the bed 330 and the edge frame 320 may be precisely coupled to each other. Further, since the bed 330 is maintained in an original position when being ejected or retracted, the bed 330 and the edge frame 320 may be precisely coupled to each other.

The protrusion 341 may be formed by protruding inward from an inner surface of the circumferential bottom 321e constituting the edge portion 321 of the edge frame 320, and the depressed portion 342 may formed by being depressed on opposite inner surfaces in the bed 330 and a rear inner surface.

In particular, depressed heights of opposite rear ends of the depressed portion 342 may be formed vertically larger than depressed heights of opposite front ends thereof. That is, as the depressed heights of opposite rear ends of the depressed portion 342 are formed larger than other portions, when the bed 330 is ejected from and then retracted in the edge portion 321, the depressed portion 342 may be smoothly coupled to the protrusion 341.

Although not shown in the drawing, the protrusion 341 may be formed in the bed 330 and the depressed portion 342 may be formed in the edge frame 320.

Further, a handle groove 335 may be provided in a front portion of the bed 330. The handle groove 335 may be a groove provided for the user to easily grip the bed 330.

The handle groove 335 may be formed by being depressed upward from a lower surface of a front end of the bed 330 (referring to FIG. 20). Although not shown in the drawing, the handle groove 335 may be formed in various forms, for example, may be formed by being depressed downward on an upper surface of the front end thereof or may be recessed inward on a front surface of the bed 330.

Further, a dam part 336 protruding upward from a surface of the water supply groove 331 may be provided in a center portion in the water supply groove 331 provided in the bed 330. The dam part 336 may be formed in a long protrusion that is long in a left and right direction of the bed 330. Based on the dam part 336, the water supply groove 331 may be formed in a circular ring, an oval ring, or a rectangular ring.

That is, when a plurality of the pods 10 are seated on the front and rear sides of the bed assembly 300 with forming each row, each pod 10 of the front row may be arranged such that the absorbing tube 16 thereof is positioned rearward and may be positioned at a front portion of the dam part 336 of each portion in the water supply groove 331, and each pods 10 of the rear row may be arranged such that the absorbing tube 16 thereof is positioned forward and may be positioned at a rear portion of the dam part 336 of each portion in the water supply groove 331.

In particular, the dam part 336 may be formed by protruding upward from a bottom in the water supply groove 331, thus the supply water does not remain therein, and the dam part 336 may serve to guide the supply water to be precisely supplied to a portion where the absorbing tube 16 of the pod 10 is positioned.

Further, on the bottom surface in the water supply groove 331, a flow guidance groove 337 may be provided in a portion of communicating with the second water supply flow path 333.

That is, the supply water flowing along the second water supply flow path 333 may be guided by the flow guidance groove 337 in the process of flowing into the water supply groove 331 to flow front one side of the water supply groove 331 to another side thereof.

The flow guidance groove 337 may be formed by being depressed than the bottom surface in the water supply groove 331, and a first end of the flow guidance groove 337 may be rounded (or inclined) from a second end of the flow guidance groove 337 to face one side in the water supply groove 331.

In addition, a sensing protrusion 338 may be formed by protruding from the bottom surface in the water supply groove 331. An upper surface of the sensing protrusion 338 may be positioned higher than the bottom surface in the water supply groove 331 and positioned lower than the upper surface of the bed 330.

Further, a support step 339 may be formed by protruding on a front side of the upper surface of the bed 330 and support the placed protrusion 314 of the bed cover 310. That is, the bed cover 310 may be precisely placed in the original position thereof by the support step 339.

Meanwhile, the bed assembly 300 may include a front cover body 350.

The front cover body 350 may be provided at the open front surface of the edge portion 321 constituting the edge frame 320. This configuration is as shown in FIGS. 10 and 11.

In particular, the front cover body 350 may be operated to block the front surface of the bed 330 or expose the front surface of the bed 330. That is, normally, the front cover body 350 may block the front surface of the bed 330 so that the inside of the cultivation room 121, 122 is not exposed, and when the bed 330 is ejected, the front cover body 350 may be operated to expose the front surface of the bed 330 to prevent interference due to ejection of the bed 330.

Upper ends of opposite sides of the front cover body 350 may be rotatably coupled to front portions of the opposite side wall ends 321a of the edge portion 321 by hinges 351. That is, as the front cover body 350 rotates based on the hinges 351, the front surface of the edge portion 321 may be opened or blocked.

The hinges 351 may be configured to maintain the open state of the front cover body 350 using a spring (not shown) or the like unless separate manipulation occurs.

In addition, the front cover body 350 may have a restraining hook 352. The restraining hook 352 may be a configuration maintaining the closed state of the front cover body 350. The restraining hook 352 may be configured to be restrained by being caught in a hook groove 321g provided in either front surface of the opposite side wall ends 321a. The restraining hook 352 may be configured to be restrained or released from the hook groove 321g by repeatedly pressing manipulation of the restraining hook 352.

In particular, a front surface of the front cover body 350 may be configured not to be in contact with an inner surface of a door 130, thus a gap may be provided between the front surface of the front cover body 350 and the door 130. That is, through the gap, air may flow between the upper cultivation room 121 and the lower cultivation room 122, and air flowing in the lower cultivation room 122 may be discharged indoors.

Through the flow of air passing through the gap, a surface of the door 130 may be prevented from condensation.

Meanwhile, a plurality of bed assemblies 300 may be provided in the apparatus. In this case, the bed assemblies 300 may be vertically spaced apart from each other in the cultivation rooms 121 and 122. A vertical distance between the bed assemblies 300 may be set differently depending on the sizes in the cultivation rooms 121 and 122 or the type of plant to be cultivated. For example, as the first guide rails 101 provided on the opposite wall surfaces in the cultivation room 121, 122 are configured to be adjusted in vertical position, the vertical distance between the bed assemblies 300 may be adjusted as needed.

Next, the lighting module 401, 402 will be described with reference to FIGS. 25 to 28.

The lighting module 401, 402 may be a part emitting light to the pod 10 seated on the bed 330 in the cultivation room 121, 122. That is, as the lighting module 401, 402 is provided in the plant cultivation apparatus, the closed-type plant cultivation apparatus may continue to provide light to the plant.

In the embodiment, the lighting module 401, 402 may be a light emitting diode (LED) 421 and be configured to emit light.

To this end, the lighting module 401, 402 may include a lighting case 410 constituting an outside appearance of the lighting module 401, 402, a circuit board 420 in which the LED 421 is embedded, and the lighting cover 430 covering the lighting case 410.

The lighting case 410 may be a part where the circuit board 420 is provided.

In addition, the lighting case 410 may have a plurality of lighting holes 411.

The circuit board 420 may be fixed on an upper surface of the lighting case 410.

The LED 421 embedded in the circuit board 420 may be arranged to emit light through each of the lighting holes 411 of the lighting case 410.

Further, the lighting cover 430 may be coupled to the lighting case to block a lower surface of the lighting case 410, thereby being exposed into the cultivation room 121, 122 and protecting the circuit board 420 from moisture in the cultivation room 121, 122.

It is preferable that a surface of the lighting cover 430 is coated or surface-processed for the diffusion of light. Thus, light emitted from the LED 421 may be uniformly dispersed to entire portions in the cultivation room 121, 122 without being focused on one portion.

In addition, the upper surface of the lighting case 410 may be provided to be covered with an upper cover 460.

Meanwhile, when the cultivation room 121, 122 in the inner case 120 is divided into two upper and lower cultivation rooms, the lighting module 401, 402 may be divided into a first lighting module 401 provided on an upper wall surface in the inner case 120, and a second lighting module 402 that is provided to cross between the upper cultivation room 121 and the lower cultivation room 122 and emit light to the lower cultivation room 122.

That is, as the second lighting module 402 may serve as a partition wall vertically dividing the inside of the cultivation room 121, 122, there is no need to provide a separate partition wall, and the size of each of the cultivation rooms 121 and 122 may be maximally secured.

The second lighting module 402 may be configured such that a rear end thereof is fixed by a shroud 520 of the circulation fan assembly 500, which will be described below.

Further, a residual water detection sensor 440 may be provided on an upper surface of the second lighting module 402. The residual water detection sensor 440 may serve to detect residual water in the water supply groove 331 of the bed 330 placed on the upper cultivation room.

In particular, the residual water detection sensor 440 may be positioned in the inside of a portion where the sensing protrusion 338 is provided, in the lower portion of the bed 330. The residual water detection sensor 440 may detect whether or not the residual water remains on an upper surface of the sensing protrusion 338 to determine the residual water in the water supply groove 331.

The residual water detection sensor 440 may be configured of a capacitance-type sensor and accurately detect the residual water in the water supply groove 331.

The residual water detection sensor 440 may also be configured in other methods not shown in the drawings. For example, the residual water detection sensor 440 may be configured as a mechanical sensor such as a floating method or an electronic sensor using two electrodes.

A temperature sensor 450 may be provided on the upper surface of the second lighting module 402. The temperature sensor 450 may serve to detect the temperature in the cultivation room 121, 122 and allow the temperature control module 600 to control the air temperature.

Next, the circulation fan assembly 500 will be described with reference to FIGS. 6, 7, and 29.

The circulation fan assembly 500 may be provided to circulate air in the cultivation room 121, 122.

The circulation fan assembly 500 may be provided in a rear portion of the cultivation room 121, 122 among portions in the cabinet 100. The circulation fan assembly 500 may suction air from a lower portion in the cultivation room 121, 122 and then to discharge the air to an upper portion in the cultivation room 121, 122.

Meanwhile, the circulation fan assembly 500 may be provided for each of the cultivation rooms 121 and 122, or may be configured as the single circulation fan assembly 500 to control air circulation for all the cultivation rooms 121 and 122.

In the embodiment of the present disclosure, the circulation fan assembly 500 may be provided for each of the cultivation rooms 121 and 122. That is, the air circulations in the cultivation rooms 121 and 122 may be performed equally or separately by the circulation fans assemblies 500, respectively.

When the air circulation may be separately controlled for each of the cultivation rooms 121 and 122, plants that require different types of cultivation environments may be simultaneously cultivated for each of the cultivation rooms 121 and 122.

The circulation fan assembly 500 may include circulation fans 510, the shroud 520, and a partition wall 530.

The circulation fan assembly 500 may include circulation fans 510, the shroud 520, and a partition wall 530.

Further, the shroud 520 may be a part that guides a flow of air blown by the circulation fans 510 as the circulation fans 510 is provided.

The shroud 520 may have an installation hole 521 formed by penetrating the shroud 520, the installation hole being provided to receive the circulation fans 510. The shroud 520 may have an air guide 522 at a front surface thereof, the air guide 522 guiding air suctioned through the circulation fans 510 from a rear portion in the cabinet 100 to flow into the cultivation room 121, 122. The air guide 522 may be configured to guide air blown in the radial direction of the circulation fans 510 to flow to the upper portion in the cultivation room 121, 122.

Further, the partition wall 530 may be a part that is positioned at the front of the shroud 520 and blocks the shroud 520 from the cultivation room 121, 122.

That is, the partition wall 530 may protect the circulation fans 510 from the inside of the cultivation room 121, 122.

A lower portion of the partition wall 530 may be open to the inside of the cultivation room 121, 122. Thus, air flowing in the cultivation room 121, 122 may flow through the open lower portion of the partition wall 530 to the rear portion in the cabinet 100 and then may heat-exchange with an evaporator 630. Continuously, the air may be supplied to the upper portion in the cultivation room 121, 122 by blowing force of the circulation fans 510 and flow guidance of the shroud 520, the above circulation of air may be repeated.

In particular, opposite side surfaces of the partition wall 530 may be fixed to the opposite wall surfaces or the rear wall surface in the inner case 120. The shroud 520 may be provided on the partition wall 530.

Next, the temperature control module 600 will be described.

The temperature control module 600 is configured to control the temperature of air circulating in the cultivation room 121, 122 of the inner case 120.

The temperature control module 600 may include a refrigerating system including the compressor 610, the condenser 620, and the evaporator 630. That is, the temperature control of the air circulating in the cultivation room 121, 122 may be performed by the refrigerating system.

The compressor 610 and the condenser 620 may be provided in the machine chamber 201 in the machine chamber frame 200. This is as shown in FIGS. 7 and 8.

The condenser 620 may be positioned at the air inflow side of the opposite sides divided by the partition 230 in the machine chamber frame 200. The compressor 610 may be positioned at a portion where air passing through the condenser 620 passes. In particular, the compressor 610 may be positioned at the air outflow side of the opposite sides divided by the partition 230 in the machine chamber frame 200.

The above structure may be configured to allow the air flowing into the machine chamber 201 of the machine chamber frame 200 to pass through the condenser 620 by priority. That is, considering that the compressor 610 is the configuration generating a great quantity of heat, when the temperature control module 600 is configured such that air passes through the compressor 610 and then heat-exchanges with the condenser 620, heat exchange efficiency may be reduced. Accordingly, it is preferable that the temperature control module 600 is configured such that air passes through the condenser 620 before the compressor 610.

In addition, the condenser 620 may be positioned at the front side in the machine chamber 201, and the compressor 610 may be positioned at the rear side in the machine chamber 201.

The structure may be configured to maximally divide positions of the compressor 610 and the condenser 620 and to separate the compressor 610 from the condenser 620, so that the effect of the high temperature heat of the compressor 610 on the condenser 620 may be reduced.

Cooling fans 611 may be provided in the air inflow side of the compressor 610, that is, at the rear side of the partition 230, so that air may flow into and be discharged from the machine chamber 201 and dissipate heat of the compressor 610. In the rear side of the partition 230, the cooling fans 611 may serve to block a portion where the compressor 610 is positioned from the air inflow side where the condenser 620 is positioned. Therefore, effect of high temperature heat of the compressor 610 on the condenser 620 may be reduced.

Further, the evaporator 630 may be arranged at a portion at the rear of the circulation fan assembly 500 among each portion in the inner case 120. That is, when the evaporator 630 performs circulated operation in which suction air is suctioned from the lower portion in the cultivation room by the operation of the circulation fan assembly 500 and is discharged to the upper portion in the cultivation room 121, 122, the air may heat-exchange with the evaporator 630 while passing therethrough.

The evaporator 630 may be a plate shaped evaporator so as to be stably installed in the rear side portion in the inner case 120 and improve heat exchange performance in a narrow place.

Meanwhile, the temperature control module 600 may have an electric heater. That is, when a plant that lives in a higher temperature environment than the normal indoor environment is cultivated, the electric heater may be used to cultivate the plant.

Next, the water supply module 700 will be described with reference to FIGS. 30 to 33.

The water supply module 700 may be configured to supply the supply water to the water supply groove 331 of the bed 330.

In the embodiment of the present disclosure, the water supply module 700 that stores the supply water in advance may be configured to pump as much water as necessary to the bed 330 when the water supply is needed.

That is, the conventional cultivation apparatus does not use the method of supplying the supply water as much water as needed, but use a method of storing enough supply water in a water storage and supplying the stored supply water to soil by using an absorbing member. Herein, the supply water is mixed with a nutrient solution, so that a problem with contamination of the supply water may occur.

However, in the embodiment of the present disclosure, as a nutrient solution material is contained in the bed soil 11 of the pod 10 and the pod 10 receives as much supply water as needed, residual water may be prevented from existing in portions other than a water tank 710, so that odor due to contamination of the supply water may be fundamentally prevented.

The water supply module 700 may include the water tank 710, a water pump 720, and an inlet hose 730.

The water tank 710 may be a part in which the supply water is stored.

The water tank 710 may be formed in a rectangular box structure that is open at an upper portion thereof, and be positioned between the bottom surface in the inner case 120 and the bed 330. That is, considering that a gap may be provided between the bottom surface in the inner case 120 and the bed 330 because the upper surface plate 214 of the machine chamber frame 200 partially protrudes upward due to the height of the compressor 610 in the machine chamber 201, the water tank 710 may be positioned in the gap so that the cultivation room 121, 122 may be formed to be large enough.

In particular, the water tank 710 may be positioned at the front portion in the cabinet 100 and be provided to be drawable forward from the cabinet 100. That is, considering that the rear portion of the machine chamber 201 may be formed to be higher than the other portion due to the height of the compressor 610, the water tank 710 may be provided in a front portion of a lower portion in the inner case 120 which is provided due to the upward protruding portion of the machine chamber 201. On the opposite side wall surfaces of the cabinet 100, second guide rails 102 may be provided to guide back and forth movement of the water tank 710.

In addition, the water tank 710 may be configured to be exposed to the indoor when the door 130 is opened. That is, the door 130 may be configured to block not only the cultivation room 121, 122 but also the water tank 710, so that the water tank 710 may be exposed outward when the door 130 is opened. Thereby, the user can easily eject the water tank 710 and replenish the supply water.

The water tank 710 may have a handle 711 at a front surface thereof, and the user can eject and retract the water tank 710 by using the handle 711 in the drawer manner.

In particular, the handle 711 of the water tank 710 may be also configured not to contact the door 130 like the front cover body 350 of the bed 330. Thus, a gap may be provided between a front surface of the handle 711 and the door 130.

Next, the water pump 720 may be a part pumping the supply water in the water tank 710.

The water pump 720 may be positioned at the rear of the water tank 710 in the lower portion in the inner case 120.

In particular, an installation frame 740 may be provided between the water tank 710 and the water pump 720, and the water pump 720 may be fixed on a rear surface of the installation frame 740. That is, when the water tank 710 is ejected, the installation frame 740 may prevent the water pump 720 from being exposed outward and allow the water pump 720 to be fixed in an original position thereof.

Further, a sensing part 741 (referring to FIG. 31) detecting whether or not the water tank 710 is ejected may be provided on a front surface of the installation frame 740. The sensing part 741 may be configured of a proximity sensor, and when the water tank 710 is adjacent to the sensing part 741, the sensing part 741 may determine that the water tank 710 is retracted in the plant cultivation apparatus. The sensing part 741 may be configured of various detecting devices, such as a touch switch.

In addition, a residual water detection sensor 742 may be provided at an upper surface of the installation frame 740. The residual water detection sensor 742 may detect residual water remaining in the water supply groove 331 of the bed 330 positioned above the installation frame 740.

In particular, the residual water detection sensor 742 may be positioned at the inside of the sensing protrusion 338 in a lower portion of the bed 330 and sense whether or not the residual water remains on the upper surface of the sensing protrusion 323 to determine the residual water in the water supply groove 331.

The residual water detection sensor 742 may be configured of a capacitance-type sensor and accurately detect the residual water in the water supply groove 331.

The first residual water detection sensor 742 may be configured of other methods not shown in the drawings. For example, the first residual water detection sensor 742 may be configured as a mechanical sensor such as a floating method or an electronic sensor using two electrodes.

In addition, a residual water detection sensor 743 may be additionally provided on the front surface of the installation frame 740. The residual water detection sensor 743 provided on the front surface of the installation frame 740 may serve to check whether or not the supply water remains in the water tank 710.

Next, the inlet hose 730 may be a part supplying the supply water pumped by the water pump 720 to the bed 330.

The inlet hose 730 may be provided such that a first end thereof is connected to the water pump 720 and a second end thereof is positioned directly above the water reservoir 322 of the edge frame 320 constituting the bed assembly 300 (referring to FIG. 14).

Meanwhile, an open upper surface of the water tank 710 constituting the water supply module 700 may be configured to be opened and closed by an opening and closing cover 750.

In addition, the opening and closing cover 750 may be provided with a water supply connection tube 760 that is connected to the water pump 720 to supply the supply water stored in the water tank 710 to the water pump 720. That is, the water pump 720 may not be configured to be directly coupled to the water tank 710, but be configured to be selectively connected thereto by the water supply connection tube 760. Whereby, only the water tank 710 may be ejected from the cabinet 100.

The water supply connection tube 760 may include an inlet tube 761 and a connection tube 762, the inlet tube 761 protruding from a lower surface of a rear side of the opening and closing cover 750 into the water tank 710, and the connection tube 762 being extended toward a rear surface of an upper end of the inlet tube 761 and connected to the water pump 720. That is, when the water tank 710 is retracted in the plant cultivation apparatus, while the connection tube 762 is connected to the water pump 720, the supply water in the water tank 710 may be pumped into the inlet hose 730 by the pumping operation of the water pump 720. Further, when the water tank 710 is ejected from the plant cultivation apparatus, the connection tube 762 may be separated from the water pump 720.

In particular, it may be preferably that the inlet tube 761 protrudes to the bottom in the water tank 710, so that the supplementing cycle of the supply water in the water tank 710 may be delayed as much as possible.

Meanwhile, non-described reference numeral 745 may be a water level detection sensor detecting water level of the supply water in the water tank 710.

The plant cultivation apparatus according to the embodiment of the present disclosure may include a display module 800.

The display module 800 may be configured to display each condition of the plant cultivation apparatus and to perform various controls.

Each condition displayed through the display module 800 may be the temperature in the cultivation room 121, 122, cultivation time, operational states.

Further, the display module 800 may be configured to be operated in a touchable manner, or may be configured to be operated by a button or a switch.

In particular, the display module 800 may be provided in the cabinet 100 or in the door 130.

However, when the display module 800 is provided in the door 130, the connection structure of various signal lines or power lines may be inevitably complicated.

Considering the above problem, the display module 800 may be preferably provided in the cabinet 100.

Moreover, considering that the sight glass 132 constituting the inside portion of the door 130 may be formed of a transparent material such as glass, the display module 800 may be preferably provided in the front of the second lighting module 402 among the lighting modules 401 and 402.

Hereinbelow, the operation of the plant cultivation apparatus according to the embodiment of the present disclosure will be described in detail for each process.

First, a provision process of the pod 10 will be described.

When the pod 10 is newly provided in the plant cultivation apparatus, the user can open the door 130, and eject the entire bed assembly 300 positioned in the cultivation room 121, 122 while the cultivation room 121, 122 of the inner case 120 is opened.

The bed assembly 300 may be slidingly moved along the first guide rails 101 and ejected from the cultivation room 121, 122 in the inner case 120. The bed assembly 300 may not be ejected completely, but may be ejected only to the point where the pod 10 may be easily seated without discomfort.

In this state, the protection film (not shown in the drawings) of the prepared pod 10 may be removed and then the pod 10 may be seated on the seating groove 312, 313 of the bed cover 310.

The pod 10 may be arranged such that the absorbing tube 16 provided in the lower surface thereof is positioned to match with the penetration hole 312a, 313a formed in the seating groove 312, 313. Thus, the pod 10 may be seated on the bed cover 310 in the state of being partially received in the seating groove 312, 313.

When a pod 10 where plant cultivation is completed is in the seating groove 312, 313 of the bed cover 310, the pod 10 with completed cultivation may be removed from the bed cover 310 and then a new pod 10 may be seated on the seating groove 312, 313.

Then, when the seating of the pod 10 is completed, the bed assembly 300 may be pushed and retracted into the cultivation room 121, 122.

The above operation may be performed about at least one or all of a bed assembly 300 of the upper cultivation room 121 and a bed assembly 300 of the lower cultivation room 122 sequentially or selectively.

Next, the cultivation process will be described.

As described above, when the pod 10 is provided in the bed assembly 300 in the cultivation room 121, 122, for germination of seeds planted in the pod 10 or for cultivation of germinated seeds in the pod 10, maintenance of temperature, provision of light, and supply of the supply water suitable for the germination and cultivation should be performed.

The control may be performed with a program set by default in the controller 20, and may be individually designated by the user.

In the embodiment of the present disclosure, the control may be automatically performed based on the program set by default. The program may vary in response to the type of plant or cultivation method.

The above-described control may be performed by manipulating the display module 800.

That is, when the cultivation operation is performed by manipulating the display module 800 in the state in which the bed assembly 300 provided with the pod 10 is provided in the cultivation room 121, 122, the controller 20 may control the temperature control module 600, the circulation fan assembly 500, the lighting module 401, 402, and the water supply module 700 to automatically cultivate the plant.

When the operation of the temperature control module 600 is controlled, the refrigerating system including the compressor 610, the condenser 620, and the evaporator 630 and the cooling fans 611 may be operated to perform refrigerating operation.

In particular, when the refrigerating operation is performed, indoor air may be suctioned into the machine chamber through the inlet 221 of the intake and exhaust grill 220 provided on the open front surface of the machine chamber 201, and air that has passed through the machine chamber may be discharged through the outlet 222 of the intake and exhaust grill 220. The indoor air suctioned into the inlet 221 may perform heat exchange and heat radiation while passing through the condenser 620, the cooling fans 611, and the compressor 610 in order, and then be discharged indoors through the outlet 222. The above operation is as shown in FIG. 34.

In addition, when the refrigerating operation is performed, the circulation fans 510 constituting the circulation fan assembly 500 may be operated.

Accordingly, air in a rear portion in the inner case 120 may pass through the circulation fans 510 and be supplied into the cultivation room 121, 122. In addition, the air may flow in the cultivation room 121, 122 and then flow to the rear portion in the inner case 120 through the open lower end of the partition wall 530 positioned at the rear of the cultivation room 121, 122. Continuously, the air may heat-exchange with the evaporator 630 positioned at the rear portion and then be supplied into the cultivation room 121, 122 by the blowing of the circulation fans 510. As the above circulation is repeated, the temperature in the cultivation room 121, 122 may be controlled. The above operation is as shown in FIG. 35.

In particular, when air circulation in the cultivation room 121, 122 is repeated by the operation of the circulation fans 510, the air may pass through the evaporator 630 while flowing rearward of the cultivation room 121, 122 and perform heat exchange, and then may be supplied upward in the cultivation room 121, 122 through the circulation fan assembly 500.

Therefore, the air flowing into the cultivation room 121, 122 may be maintained at the predetermined temperature while flowing in the cultivation room 121, 122, thus the plant may be cultivated under the optimum temperature condition.

Meanwhile, a part of air circulating in the upper cultivation room 121 may flow into the first cultivation room 121 while passing through the gap between the front surface of the upper bed assembly 300 and the door 130. A part of air circulating in the lower cultivation room 122 may pass through the gap between the front surface of the lower bed assembly 300 and the door 130. Therefore, the surface of the door 130 may be prevented from condensation by flow of the air passing through each gap.

Further, when the cultivation operation is performed, the operation of the lighting module 401, 402 may be also controlled.

By the control of the operation of the lighting module 401, 402, the LED 421 may be periodically lit (or continuously lit) to supply lighting to the plant in the cultivation room 121, 122.

Even when the LED 421 emits light under the control of the lighting module 401, 402, light in the cultivation room 121, 122 may be transmitted to the indoor through the protecting film (or, dark colored tinted glass, not shown) of the sight glass 132 constituting the door 130, so that leakage of light and discomfort of the indoor user may be minimized.

In addition, when the cultivation operation is performed, the operation control of the water supply module 700 may be performed periodically (or when necessary).

That is, when the cultivated plant and the water supply cycle of the plant are determined, the operation control of the water pump 720 may be performed for each water supply cycle. When the operation of the water pump 720 is controlled and the sensing part 741 detects that the water tank 710 is not in place, the water pump 720 may be controlled not to be operated.

Whereas, when the sensing part 741 detects that the water tank 710 exists, the water pump 720 may be operated to supply the supply water stored in the water tank 710 to each bed 300.

Then, the supply water may be pumped to the water pump 720 through the water supply connection tube 760, and be supplied to the water reservoir 322 of the bed assembly 300 through the inlet hose 730.

The supply water supplied to the water reservoir 322 may be supplied to the second water supply flow path 333 of the bed 330 by guidance of the first water supply flow path 323 connected to the water reservoir 322 and then be supplied to the water supply groove 331 along the second water supply flow path 333. Herein, since the bank parts 324, 334 are provided at the opposite sides of each of the first water supply flow path 323 and the second water supply flow path 333, the supply water may flow smoothly into the water supply groove 331 along the water supply flow path 323, 333.

In particular, considering that the flow guidance groove 337 may be provided in the communication portion between the water supply flow path 323, 333 and the water supply groove 331 and the water supply groove 331 may be formed in a ring shape structure in which the dam part 336 is provided at the center thereof, the supply water flowing into any one portion in the water supply groove 331 by guidance of the water supply flow path 323, 333 may flow from the one portion of the water supply groove 331 to another portion thereof by guidance of the flow guidance groove 337 to be filled in the water supply groove 331 in order. The above description is as shown in FIG. 36.

Further, the supply water filled in the water supply groove 331 may be absorbed in the bed soil 11 of the pod 10 through the absorbing tube 16 of the pod 10, which is provided to be in contact with the supply water in the water supply groove 331, to be supplied to the plant.

Meanwhile, during the above-described water supply process, the residual water detection sensor 440, 742 may detect the water level of the supply water in the water supply groove 331.

That is, when the residual water detection sensor 440, 742 checks whether or not the supply water remains on the surface of the sensing protrusion 338 of the water supply groove 331 and determines the remaining of the supply water, the operation of the water pump 720 may be stopped so that the supply water is not supplied.

The water supply method of using the residual water detection sensor 440, 742 may be intended to prevent the residual water in the water supply groove 331 of the bed 330. That is, since the pod is received as much water as needed, occurrence of residual water due to excessive water supply and contamination of the produced residual water may be prevented.

In particular, considering that increasing amount of the supply water is needed as the plant grows, the method according to the embodiment of the present disclosure may be configured such that, when the plant absorbs more water, more water may be supplied to the bed, thus water may always be properly supplied even when enough moisture changes as the plant grow.

Next, a washing process of the bed 330 will be described.

It is preferable that the water supply groove 331 of the bed 330 is washed (or cleaned) often.

That is, the plant cultivation apparatus according to the embodiment of the present disclosure may cultivate the plant in a way that no residual water is left in the water supply groove 331 by supplying as much water as needed to the pod 10. However, some of the bed soil in the pod 10 may fall and remain in the water supply groove 331 or part of the supply water supplied into the water supply groove 331 may remain therein due to an unexpected cause (for example, error in water supply, etc.). Therefore, it is preferable that the bed 330 is washed periodically.

Washing of the bed 330 may be performed by ejecting only the bed 330 from the cultivation room 121, 122 without separation or removal of the pod 10 where the cultivated plant is positioned.

That is, when the bed 330 is washed, rather than ejecting the entire bed assembly 300 from the cultivation room 121, 122, only the bed 330 may be ejected therefrom and then washed, so that inconvenience (for example, separation of each pod and separation of the bed cover, etc.) caused by ejecting the entire bed assembly 300 may be solved.

In particular, even while the bed 330 is washed, the cultivated plant planted in the pod 10 may be in the optimal cultivation environment in the cultivation room 121, 122, so that defective cultivation may be prevented.

Further, when the bed 330 is ejected from the cultivation room 121, 122, the front cover body 350 constituting the bed assembly 300 may be manipulated. That is, the front cover body 350 may rotate to open the front of the bed 330, and the bed 330 may be ejected while the handle groove 335 of the bed 330 is gripped by the user. The above operation is as shown in FIGS. 37 to 39.

When the bed 330 is ejected, the depressed portion 342 of the bed 330 may move slidingly by guidance of the protrusion 341 of the edge frame 320 and be taken forward.

Accordingly, among the bed assembly 300, only the bed 330 may be ejected. After each portion of the bed 330 that is ejected is washed, the bed 330 may be retracted into the edge frame 320 in reverse order.

Meanwhile, when the cultivation of the plant is completed, like the above-described process of providing the pod, the entire bed assembly 300 may be ejected from the cultivation room 121, 122, the pod 10 may be separated from the bed cover 310, and then a new pod 10 may be sequentially mounted on the bed cover 310.

The new pod 10 may be provided by replacing the bed cover 310.

That is, a bed cover 310 with the completed cultivation state pod 10 may be replaced with a bed cover 310 with the new pod.

In the plant cultivation apparatus of the present disclosure, the bed assembly 300 may be configured to perform the role of a partition wall dividing the cultivation rooms 121 and 122, so that the size of the cultivation place may be maximized.

In particular, in the plant cultivation apparatus of the present disclosure, the supply water supplied to the water supply groove 331 of the bed 330 may not be supplied over a predetermined level (height enough to be sensed by the water level sensor), but may be supplied to the pod 10 in a way that frequently supplies only the required amount of water. Therefore, occurrence of residual water in the water supply groove 331 may be prevented, and contamination or odor in the cultivation room 121, 122 due to the residual water may be prevented.

Further, in the plant cultivation apparatus of the present disclosure, the bed cover 310 on which the pod 10 is seated may be ejected from the cultivation room 121, 122 as needed. Therefore, operation such as replacement of the pod 10 may be easily performed.

Further, in the plant cultivation apparatus of the present disclosure, the bed cover 310 on which the pod 10 is seated may not be ejected, but only the bed 330 may be ejected. Therefore, washing or maintenance of the bed 330 may be easily performed.

Further, in the plant cultivation apparatus of the present disclosure, the separated portion between the bed 330 and the edge frame 320 may not be exposed outward by the front cover body 350. Therefore, since the door 130 may be formed of the transparent material such as glass, the exterior design of the plant cultivation apparatus may be enhanced.

Further, in the plant cultivation apparatus of the present disclosure, the bed 330 may be exposed outward by the front cover body 350 only when washing or maintenance of the bed 330 is performed. Therefore, the bed 330 may be prevented from being unexpectedly ejected.

Further, in the plant cultivation apparatus of the present disclosure, when supply water is supplied into the water supply groove 331, the supply water may be prevented from overflowing around the bed 330 by the structures of the water supply flow path 323, 333 and the bank parts 324, 334. Therefore, water supply may be smoothly performed.

The invention claimed is:

1. A plant cultivation apparatus comprising:
a cabinet having a cultivation room;
a water supply module positioned at a bottom of the cabinet;
a bed assembly positioned above the water supply module and receiving supply water from the water supply module;
a pod seated on an upper surface of the bed assembly; and
a lighting module positioned above the bed assembly and providing lighting for plant cultivation,
wherein the bed assembly comprises:
a bed cover having a seating groove on which the pod is seated, the seating groove being depressed on the bed cover;
an edge frame including two side walls positioned opposite each other and a rear wall, and being open at a front surface thereof; and
a bed configured to be separable between the two side walls and the rear wall and configured to be ejected forward from the edge frame and having a water supply groove to store the supply water.

2. The plant cultivation apparatus of claim 1, wherein the edge frame of the bed assembly is configured to slide into and out of the cultivation room in the cabinet.

3. The plant cultivation apparatus of claim 1, wherein a protrusion and a depressed portion are respectively formed on facing surfaces of the edge frame and the bed that constitute the bed assembly, the protrusion and the depressed portion being engaged with each other.

4. The plant cultivation apparatus of claim 3, wherein the protrusion is formed by protruding from each of opposite inner surfaces and a rear inner surface of the edge frame, and the depressed portion is formed by being depressed from each of opposite inner surfaces and a rear inner surface of the bed.

5. The plant cultivation apparatus of claim 1, wherein the bed is configured to be ejected forward from a position in which a front surface thereof is positioned inside a front surface of the edge frame, and a front cover body that blocks the front surface of the bed is provided at the front surface of the edge frame.

6. The plant cultivation apparatus of claim 5, wherein the front cover body is configured to be rotatable so that the front surface of the bed is selectively opened.

7. A plant cultivation apparatus comprising:
a cabinet having a cultivation room;
a water supply module positioned at a bottom of the cabinet;
a bed assembly positioned above the water supply module and receiving supply water from the water supply module;
a pod seated on an upper surface of the bed assembly; and
a lighting module positioned above the bed assembly and providing lighting for plant cultivation,
wherein the bed assembly comprises:
a bed cover having a seating groove on which the pod is seated, the seating groove being depressed on the bed cover;
an edge frame configured to receive the supply water; and
a bed configured to be separable from the edge frame and having a water supply groove formed by being depressed on the bed, and
wherein the edge frame of the bed assembly comprises:
an edge portion providing a circumferential wall surface of the edge frame and being open at a front surface thereof;
a water reservoir positioned at either outer wall of the edge portion and receiving the supply water; and
a first water supply flow path guiding the supply water supplied to the water reservoir into the bed.

8. The plant cultivation apparatus of claim 7, wherein the water reservoir is formed by protruding from an outer surface of a rear wall of the edge portion and is configured as a container body that is open at an upper surface thereof.

9. The plant cultivation apparatus of claim 7, wherein the bed cover has a placed protrusion protruding downward therefrom, and the edge frame has a placing groove in which the placed protrusion is received.

10. The plant cultivation apparatus of claim 9, wherein the placing groove comprises a first placing groove formed on a portion between the edge portion and the water reservoir.

11. The plant cultivation apparatus of claim 9, wherein the placing groove comprises a second placing groove formed on an upper surface of the edge portion.

12. The plant cultivation apparatus of claim 9, wherein an end of a lower portion of the placed protrusion is rolled to be rounded.

13. The plant cultivation apparatus of claim 9, wherein a support step protrudes upward on an upper surface of the bed, the support step supporting a front surface of the placed protrusion.

14. The plant cultivation apparatus of claim 7, wherein a second water supply flow path is formed on an upper surface of the bed and guides the supply water supplied from the first water supply flow path to the water supply groove.

15. The plant cultivation apparatus of claim 14, wherein the first water supply flow path is formed by being depressed downward on an upper surface of the edge frame, and the second water supply flow path is formed by being depressed downward on a rear portion of the upper surface of the bed.

16. The plant cultivation apparatus of claim 15, wherein the first water supply flow path and the second water supply flow path are inclined downward as the first and second water supply flow paths go from the water reservoir to a height of a surface of the water supply groove formed on the bed.

17. The plant cultivation apparatus of claim 15, wherein on opposite sides of a depressed portion having the first water supply flow path in the upper surface of the edge frame, first bank parts protrude upward on the upper surface of the edge frame, and on opposite sides of a depressed portion having the second water supply flow path in the upper surface of the bed, second bank parts protrude upward from the upper surface of the bed.

* * * * *